United States Patent
Alameh et al.

(10) Patent No.: US 11,093,659 B2
(45) Date of Patent: *Aug. 17, 2021

(54) CONTROLLING CONTENT VISIBILITY ON A COMPUTING DEVICE BASED ON WEARABLE DEVICE PROXIMITY

(71) Applicant: Motorola Mobility LLC, Chicago, IL (US)

(72) Inventors: Rachid M. Alameh, Crystal Lake, IL (US); Jarrett K. Simerson, Glenview, IL (US); John J. Gorsica, IV, Round Lake, IL (US); Zhengping Ji, Hinsdale, IL (US)

(73) Assignee: Motorola Mobility LLC, Chicago, IL (US)

(*) Notice: Subject to any disclaimer, the term of this patent is extended or adjusted under 35 U.S.C. 154(b) by 42 days.

This patent is subject to a terminal disclaimer.

(21) Appl. No.: 16/394,264

(22) Filed: Apr. 25, 2019

(65) Prior Publication Data

US 2020/0342144 A1 Oct. 29, 2020

(51) Int. Cl.
*G06F 21/84* (2013.01)
*G06F 21/62* (2013.01)
(Continued)

(52) U.S. Cl.
CPC .......... *G06F 21/84* (2013.01); *G06F 3/0482* (2013.01); *G06F 3/04817* (2013.01); *G06F 21/6245* (2013.01); *G06F 2221/2149* (2013.01)

(58) Field of Classification Search
USPC .......................................................... 726/2
See application file for complete search history.

(56) References Cited

U.S. PATENT DOCUMENTS 9,092,969 B2 7/2015 McCown et al.
9,355,231 B2 5/2016 Disraeli
(Continued)

FOREIGN PATENT DOCUMENTS

EP 3291167 7/2018
EP 2992692 B1 * 8/2018 ............... H04N 7/15

OTHER PUBLICATIONS

"Android Developers—Docs—Guides—VPN", Retrieved at: https://developer.android.com/guide/topics/connectivity/vpn—on Mar. 20, 2019, 12 pages.
(Continued)

*Primary Examiner* — Eleni A Shiferaw
*Assistant Examiner* — Sakinah White Taylor
(74) *Attorney, Agent, or Firm* — FIG. 1 Patents

(57) ABSTRACT

Content visibility on a computing device is controlled based at least in part on the proximity of a wearable device to the computing device. When the wearable device is in close proximity to the computing device and the computing device is unlocked, the computing device operates in a full content visibility mode. In the full content visibility mode all user-selectable content on the computing device is displayed. When the wearable device is not in close proximity to the computing device and the computing device is unlocked, the computing device operates in a reduced content visibility mode. In the reduced content visibility mode content visibility on the computing device screen is reduced, such as by limiting which applications (e.g., application icons or widgets) are displayed.

20 Claims, 15 Drawing Sheets

(51) Int. Cl.
*G06F 3/0481* (2013.01)
*G06F 3/0482* (2013.01)

(56) References Cited

U.S. PATENT DOCUMENTS

| | | | |
|---|---|---|---|
| 10,380,425 B2* | 8/2019 | Wexler | G06F 3/017 |
| 10,386,960 B1 | 8/2019 | Smith | |
| 10,701,067 B1 | 6/2020 | Ziraknejad et al. | |
| 10,963,586 B1* | 3/2021 | Sculley | G06Q 10/105 |
| 2005/0221798 A1* | 10/2005 | Sengupta | H04M 1/67 |
| | | | 455/411 |
| 2007/0067738 A1 | 3/2007 | Flynt et al. | |
| 2013/0225309 A1* | 8/2013 | Bentley | G06K 9/00342 |
| | | | 473/266 |
| 2015/0161701 A1* | 6/2015 | Bretscher | G06Q 30/0621 |
| | | | 705/26.5 |
| 2015/0178822 A1* | 6/2015 | Babiarz | G06Q 30/00 |
| | | | 705/26.7 |
| 2015/0288719 A1 | 10/2015 | Freudiger et al. | |
| 2015/0310434 A1 | 10/2015 | Cheung | |
| 2015/0370323 A1* | 12/2015 | Cieplinski | H04N 21/42203 |
| | | | 345/156 |
| 2016/0011767 A1* | 1/2016 | Jung | G06K 9/0004 |
| | | | 715/847 |
| 2016/0224779 A1 | 8/2016 | Kitane et al. | |
| 2016/0253141 A1* | 9/2016 | Sarkar | G06F 1/1694 |
| | | | 345/156 |
| 2016/0378302 A1* | 12/2016 | Gilger | G06Q 10/067 |
| | | | 715/736 |
| 2017/0041789 A1 | 2/2017 | Waldron et al. | |
| 2017/0116846 A1 | 4/2017 | Wengrovitz et al. | |
| 2017/0193303 A1* | 7/2017 | Wexler | G06K 9/00684 |
| 2018/0137681 A1* | 5/2018 | Chang | G06F 3/017 |
| 2018/0217966 A1* | 8/2018 | Buttolo | G06F 16/951 |
| 2018/0350144 A1* | 12/2018 | Rathod | G06Q 20/3276 |
| 2019/0171806 A1 | 6/2019 | Embrechts et al. | |
| 2019/0182670 A1 | 6/2019 | Maragoudakis | |
| 2019/0205010 A1* | 7/2019 | Fujii | G06F 3/0482 |
| 2019/0286298 A1* | 9/2019 | Wantland | G06F 3/0481 |
| 2019/0373472 A1 | 12/2019 | Smith et al. | |
| 2020/0285752 A1* | 9/2020 | Wyatt | G06F 21/577 |
| 2020/0304445 A1* | 9/2020 | Dinhthi | H04L 41/22 |
| 2020/0342076 A1 | 10/2020 | Alameh et al. | |
| 2020/0342133 A1 | 10/2020 | Alameh et al. | |
| 2020/0344213 A1 | 10/2020 | Gorsica et al. | |

OTHER PUBLICATIONS

"Locly Native App Platform", Retrieved at: https://locly.com/—on Apr. 19, 2019, 15 pages.

"Lock your Windows 10 PC automatically when you step away from it", Retrieved at: https://support.microsoft.com/en-us/help/4028111/windows-lock-your-windows-10-pc-automatically-when-you-step-away-from—on Apr. 19, 2019, 2 pages.

Sprager,"Inertial Sensor-Based Gait Recognition: A Review", Sep. 2, 2015, pp. 22090-22127.

"Non-Final Office Action", U.S. Appl. No. 16/394,327, dated Nov. 24, 2020, 18 pages.

"Corrected Notice of Allowability", U.S. Appl. No. 16/394,327, dated Jul. 6, 2021, 2 pages.

"Non-Final Office Action", U.S. Appl. No. 16/394,290, dated Jul. 6, 2021, 9 pages.

"Notice of Allowance", U.S. Appl. No. 16/394,327, dated Apr. 14, 2021, 13 pages.

"Restriction Requirement", U.S. Appl. No. 16/394,307, dated May 19, 2021, 7 pages.

* cited by examiner

CONTROLLING CONTENT VISIBILITY ON A COMPUTING DEVICE BASED ON WEARABLE DEVICE PROXIMITY

BACKGROUND

As technology has advanced, computing devices have become increasingly commonplace in our lives. For example, many people have mobile devices such as phones or tablets that they carry with them and use throughout the day. While these devices have provided many benefits to our lives, they are not without their problems. One such problem is that oftentimes people share their devices. However, the owner of the device may have confidential information or other information on the device that he or she does not want another person to have access to. For example, a mother may hand her phone to her child so that the child can play games on the phone, but she does not want the child placing phone calls to her work contacts or accessing confidential medical information stored on her phone. Some devices do support multiple user accounts so the owner of the device could set up a user account for other people to use. However, switching between user accounts can be cumbersome, and some devices (e.g., many mobile phones) do not support multiple user accounts. These difficulties in sharing a device can be frustrating for users, resulting in user dissatisfaction with their devices.

BRIEF DESCRIPTION OF THE DRAWINGS

Embodiments of controlling content visibility on a computing device based on wearable device proximity are described with reference to the following drawings. The same numbers are used throughout the drawings to reference like features and components.

DETAILED DESCRIPTION

Figure 1:
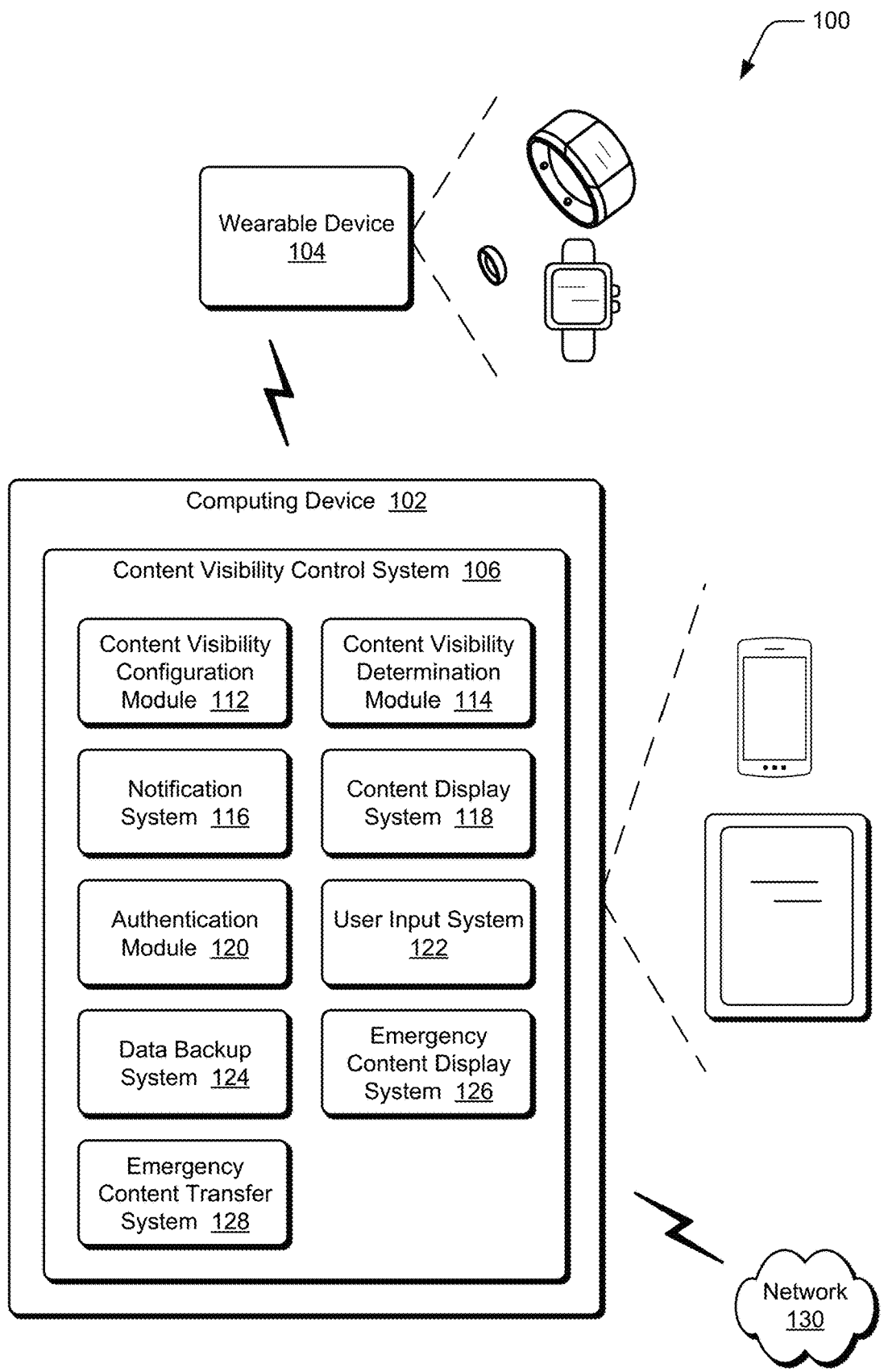
FIG. 1 illustrates an example environment in which the techniques discussed herein can be used.

Controlling content visibility on a computing device based on wearable device proximity is discussed herein. A user of a computing device has a wearable device that is associated with the computing device. This association can be made in any of a variety of different manners, such as by pairing the wearable device with the computing device (e.g., using Bluetooth pairing).

In one or more embodiments, content visibility on the computing device is controlled based at least in part on the proximity of the wearable device to the computing device. When the wearable device is in close proximity to the computing device (and optionally the user is authenticated to the wearable device, or the user is wearing the wearable device, or the user is both authenticated to the wearable device and wearing the wearable device) and the computing device is unlocked, the computing device operates in a full content visibility mode. The computing device is unlocked in response to an authentication input that verifies a user is authorized to access user-selectable content and functionality of the computing device. The computing device can be automatically unlocked in response to the wearable device being in close proximity to the computing device (and optionally the user is authenticated to the wearable device, or the user is wearing the wearable device, or the user is both authenticated to the wearable device and wearing the wearable device), or the computing device can be unlocked in response to additional user input (e.g., input of a passcode to the computing device or wearable device, having a fingerprint scanned by the computing device or wearable device). In the full content visibility mode content is fully visible on the computing device screen. Content being fully visible on the computing device screen includes all user-selectable content on the computing device being displayed on a display screen of the computing device. It should be noted that not all user-selectable content may be displayed concurrently. Rather, the user may access different pages displaying different user-selectable content.

In contrast, when the wearable device is not in close proximity to the computing device (or optionally not worn by the user or the user is not authenticated to the wearable device), such as if the owner hands the phone to a friend or someone took the device, and the computing device is unlocked, the computing device operates in a reduced content visibility mode. In the reduced content visibility mode content visibility on the computing device screen is reduced. Content visibility can be reduced in various manners, such as by limiting which applications (e.g., application icons or widgets) are intelligibly displayed. The content that is intelligibly displayed in the reduced content visibility mode is also referred to as a reduced subset of the user-selectable content. It should be noted that not all content in the reduced subset of user-selectable content may be displayed concurrently. Rather, the user may access different pages displaying different content in the reduced subset of user-selectable content.

Additionally or alternatively, content visibility on the computing device is controlled based at least in part on the current location of the computing device. The current location of the computing device is determined, and a determination is made as to whether the current location is a safe location for making user-selectable content visible on a display screen of the computing device. If the current location is a safe location for making user-selectable content visible on a display screen of the computing device, then the computing device operates in the full content visibility mode. However, if the current location is not a safe location for making user-selectable content visible on a display screen of the computing device, then the computing device operates in the reduced content visibility mode.

The techniques discussed herein enhance the security of a computing device, assuring the owner of the computing device that content the owner does not want others to access will not be intelligibly displayed to other users with which the owner is sharing the computing device. This enhanced security is provided without the need for separate user accounts on the computing device, allowing the computing device to switch between the full content visibility mode and the reduced content visibility mode without having a user(s) log into different accounts. For example, if the computing device is being used by the owner while he or she is wearing the wearable device, then user-selectable content on the computing device is fully visible to the owner. However, if the computing device is being used by another user (e.g., the owner's child) who is not wearing the wearable device, then user-selectable content on the computing device is not fully visible to the other user. Rather, a reduced subset of the user-selectable content is visible to the other user. The owner can specify which content is in the reduced subset of user-selectable content, allowing the owner to control what user-selectable content another user can access.

FIG. 1 illustrates an example environment 100 in which the techniques discussed herein can be used. The environment 100 includes a computing device 102 and a wearable device 104. The computing device 102 can be, or include, many different types of computing or electronic devices. For example, the computing device 102 can be a mobile device designed to be easily carried by a user, such as a smartphone or other wireless phone, a notebook computer (e.g., netbook or ultrabook), a laptop computer, an augmented reality headset or device, a virtual reality headset or device, a tablet or phablet computer, an entertainment device (e.g., a gaming console, a portable gaming device, a streaming media player, a digital video recorder, a music or other audio playback device), and so forth. By way of further example, the computing device 102 can be a device designed to be more stationary than mobile, such as a desktop computer, a television, a television set-top box, and so forth.

The wearable device 104 can be, or include, many different types of portable computing or electronic devices. The wearable device 104 is a device designed to be worn by a user or regularly carried by a user. For example, the wearable device 104 can be a smartwatch, an augmented reality headset or device, a virtual reality headset or device, jewelry (e.g., a ring, a bracelet, a necklace), a fitness tracker, a key fob, and so forth. E.g., the computing device 102 can be a smartphone and the wearable device 104 can be a smartwatch. By way of further example, the wearable device 104 can be a mobile device, particularly in situations where the computing device 102 is a stationary device. E.g., the computing device 102 can be a desktop computer and the wearable device 104 can be a smartphone.

The computing device 102 includes a content visibility control system 106. The content visibility control system 106 controls content visibility on a display screen of the computing device 102. The content visibility control system 106 includes a content visibility configuration module 112, a content visibility determination module 114, a notification system 116, a content display system 118, an authentication module 120, a user input system 122, a data backup system 124, an emergency content display system 126, and an emergency content transfer system 128.

The content visibility configuration module 112 configures the reduced content visibility mode. In one or more implementations, the content visibility configuration module 112 facilitates user selection of which content on the computing device 102 is not to be intelligibly displayed in the reduced content visibility mode. In one or more embodiments, the content visibility determination module 114 determines whether a wearable device 104 associated with the computing device 102 and an authorized user of the computing device 102 is in close proximity to the computing device 102. Additionally or alternatively, the content visibility determination module 114 determines whether a current location of the computing device 102 is a safe location for making user-selectable content visible on a display screen of the computing device 102.

The notification system 116 provides various alerts, updates, and other notifications to the user of the computing device 102. The content display system 118 manages the display of content on the display screen of the computing device 102. The authentication module 120 authenticates a user of the computing device 102, such as using a password, personal identification number (PIN), passcode, fingerprint scan, face scan, and so forth. The information to authenticate the user can be provided by the user as inputs to the computing device 102 and/or to the wearable device 104. The user input system 122 receives inputs of a user, such as gesture inputs via a touchscreen, touching or tapping inputs via a touchscreen, text inputs, audio inputs, and so forth. The data backup system 124 backs up new data to the cloud (e.g., to one or more servers via the network 130) in situations in which the wearable device 104 is not in close proximity to the computing device 102. The emergency content display system 126 displays medical information on the display screen of the computing device 102 in response to an indication that the wearable device has detected a potential user health issue. The emergency content transfer system 128 transfers medical information to the device of a responder in response to an indication that the wearable device has detected a potential user health issue.

The wearable device 104 is associated with the computing device 102. In one or more embodiments, the wearable device 104 is associated with the computing device 102 by pairing the wearable device 104 with the computing device 102 (e.g., using Bluetooth pairing). Additionally or alternatively, this association can be made in other manners. For example, the owner of the wearable device 104 and the computing device 102 can manually input to the computing device 102 an identifier of the wearable device 104, and manually input to the wearable device 104 an identifier of the computing device 102. Associating the wearable device 104 with the computing device 102 allows the computing device 102 to operate in the full content visibility mode when a wearable device 104 known to the computing device 102 (associated with the computing device 102) is within close proximity to the computing device 102.

The wearable device 104 can also be associated with a particular user of the computing device 102. This association can be implicit. For example, when the wearable device 104 is associated with the computing device 102, the user is logged into the computing device 102 (e.g., using his or her name and password, using a scanned fingerprint, using a PIN). The user logged into the computing device 102 when the wearable device 104 was paired with the computing device 102 is the user associated with the wearable device 104. The computing device 102 can, for example, pass an identifier of the user to the wearable device 104.

Additionally or alternatively, this association of the wearable device 104 with a particular user of the computing device 102 can also be explicit. For example the user can authenticate himself or herself to both the wearable device 104 and the computing device 102 (e.g., using his or her name and password, using a scanned fingerprint, using a PIN). The wearable device 104 and the computing device 102 can then communicate with each other and verify that the same user (e.g., same user identifier) has authenticated himself or herself to both of the wearable device 104 and the computing device 102.

The computing device 102 operates in either a full content visibility mode or a reduced content visibility mode. In the full content visibility mode content is fully visible on the display screen of the computing device 102, typically across multiple different pages (e.g., all applications are visible). Content being fully visible on the computing device screen includes all user-selectable content on the computing device being displayed on a display screen of the computing device 102. User-selectable content refers to content that a user can select to activate or display (e.g., run applications, display images, call phone numbers), as well as settings or preferences for the computing device 102 that a user can select (e.g., background images, wallpapers, lock screen images) and notifications, alerts, and updates associated with content that a user can select to activate or display (e.g., meeting notifications, text message alerts, availability of a new version of an application). User-selectable content also refers to user selectable setting controls, such as setting controls for enabling/disabling wireless links, setting controls for security, setting controls for adding/removing accounts, and so forth.

In the reduced content visibility mode content visibility on the display screen of the computing device 102 is reduced. Content visibility being reduced refers to content not being intelligibly displayed, such as not being fully visible on the computing device screen, being blurred on the device screen, or being scrambled on the device screen. Whether the computing device 102 is to operate in the full content visibility mode or the reduced content visibility mode can be determined in different manners, such as whether the wearable device 104 is in close proximity to the computing device, or whether a current location of the computing device 102 is a safe location for making user-selectable content visible on a display screen of the computing device 102.

Figure 2:
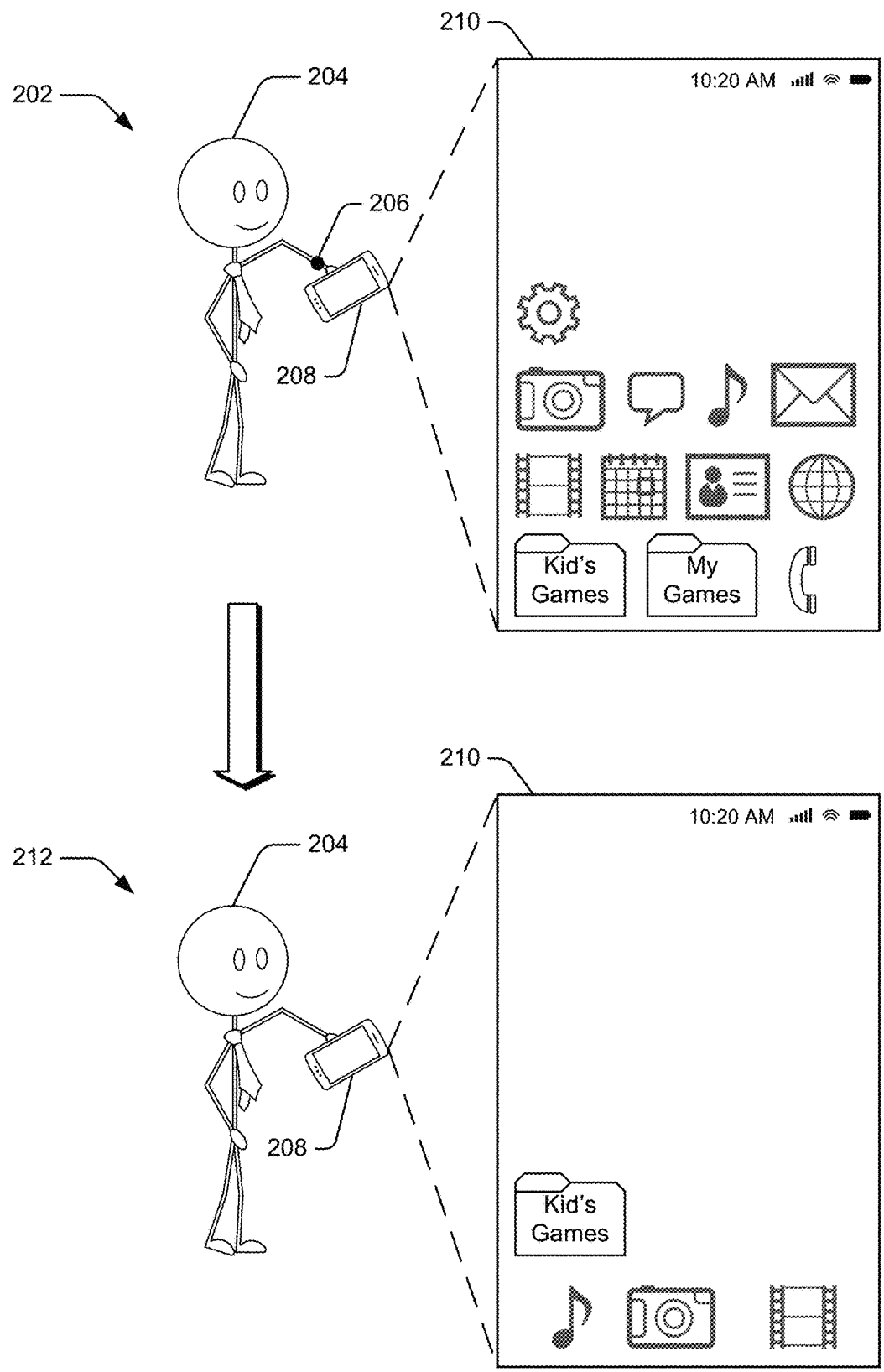
FIGS. 2, 3, 4, and 5 illustrate example operations of the techniques discussed herein.

FIG. 2 illustrates an example operation of the techniques discussed herein. At 202 a user 204 is illustrated. The user 204 is wearing a wearable device 206 illustrated as a smartwatch, and has a computing device 208 illustrated as a smartphone. At 202 the wearable device 206 is in close proximity to the computing device 208 and the computing device 208 is unlocked, so the computing device 208 is operating in a full content visibility mode. As illustrated by display screen 210, in the full content visibility mode all user-selectable content on the computing device 208 is visible on the display screen 210. The user-selectable content is illustrated as two folders labelled "Kid's Games" and "My Games", as well as several icons that represent applications or operating system programs that can be selected by the user 204 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 212 the user is illustrated at a later time than at 202. At 212, the user 204 is no longer wearing the wearable device 206. Accordingly, at 212 the computing device 208 is unlocked but the wearable device 206 is not in close proximity to the computing device 208, so the computing device 208 is operating in a reduced content visibility mode. As illustrated by display screen 210, in the reduced content visibility mode a reduced subset of user-selectable content is visible on the display screen 210. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 210, the gear icon, the speech balloon icon, the envelope icon, the calendar icon, the business card icon, the globe icon, and the telephone handset icon are not displayed. Without these icons being displayed, the user 204 is unable to select these icons and run the settings program, the texting application, the email application, the calendaring program, the contact list program, the web browser, and the telephone communication program, respectively.

Figure 3:
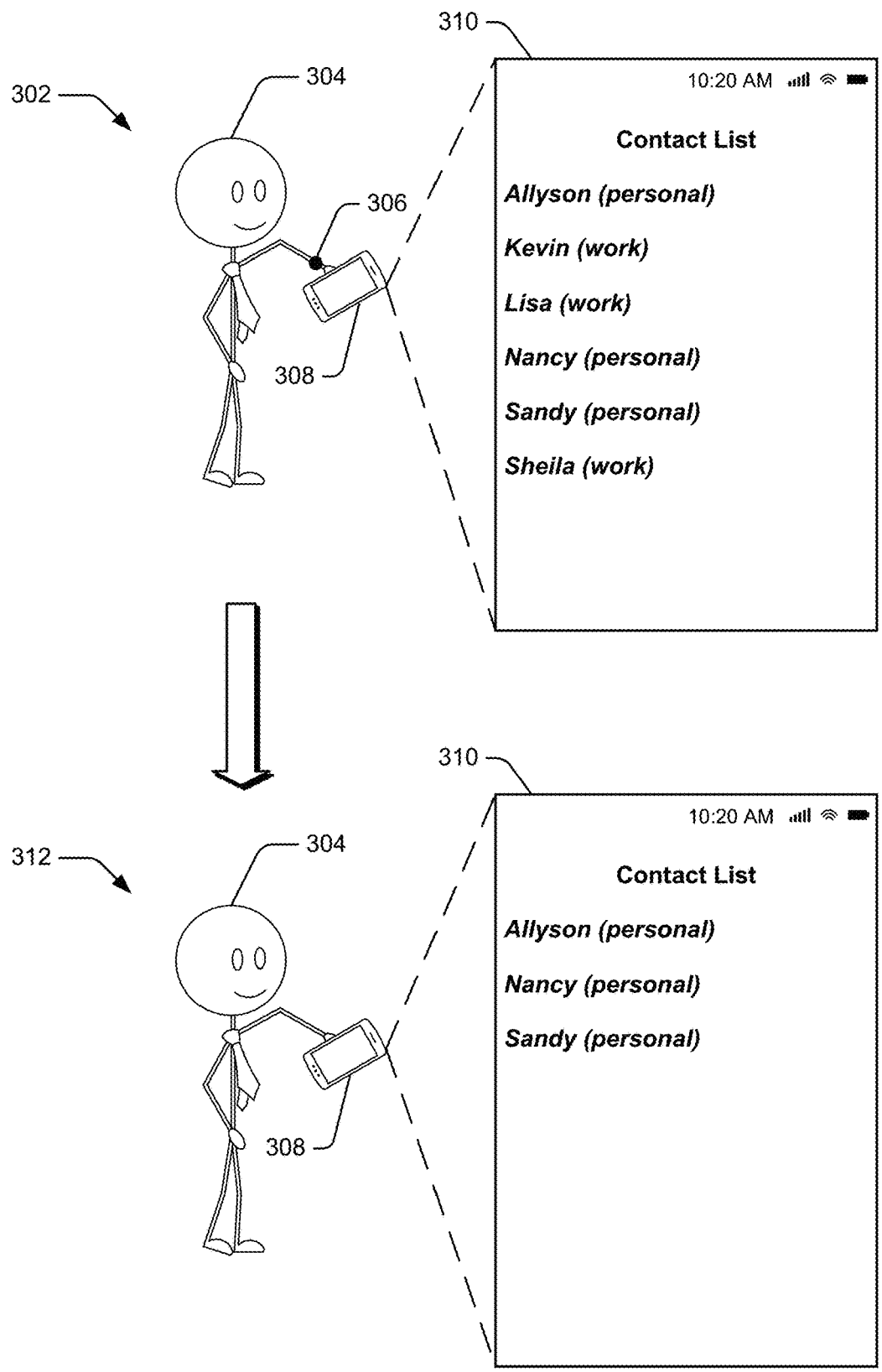

FIG. 3 illustrates another example operation of the techniques discussed herein. At 302, the user 304 wearing a wearable device 306, illustrated as a smartwatch, and having a computing device 308 illustrated as a smartphone, is illustrated. At 302 the wearable device 306 is in close proximity to the computing device 308 and the computing device 308 is unlocked, so the computing device 308 is operating in a full content visibility mode. As illustrated by display screen 310, in the full content visibility mode all user-selectable content on the computing device is visible on the display screen 310. The user-selectable content is illustrated as a contacts list and an individual's name can be selected by the user to display various contact information regarding the individual (e.g., phone numbers, email addresses, mailing addresses), to contact an individual (e.g., call a phone number, send a text message). The contacts list includes various names and an indication of whether the individual is a personal or work contact.

At 312 the user is illustrated at a later time than at 302. At 312, the user 304 is no longer wearing the wearable device 306. Accordingly, at 312 the computing device 308 is unlocked but is not in close proximity to the computing device 308, so the computing device 308 is operating in a reduced content visibility mode. As illustrated by display screen 310, in the reduced content visibility mode a reduced subset of user-selectable content is visible on the display screen 310. The user-selectable content is illustrated as a contacts list that includes only personal contacts, not work contacts. Without these contacts being displayed, the user 304 is unable to select these contacts and obtain contact information for, or contact, the work contacts.

Figure 4:
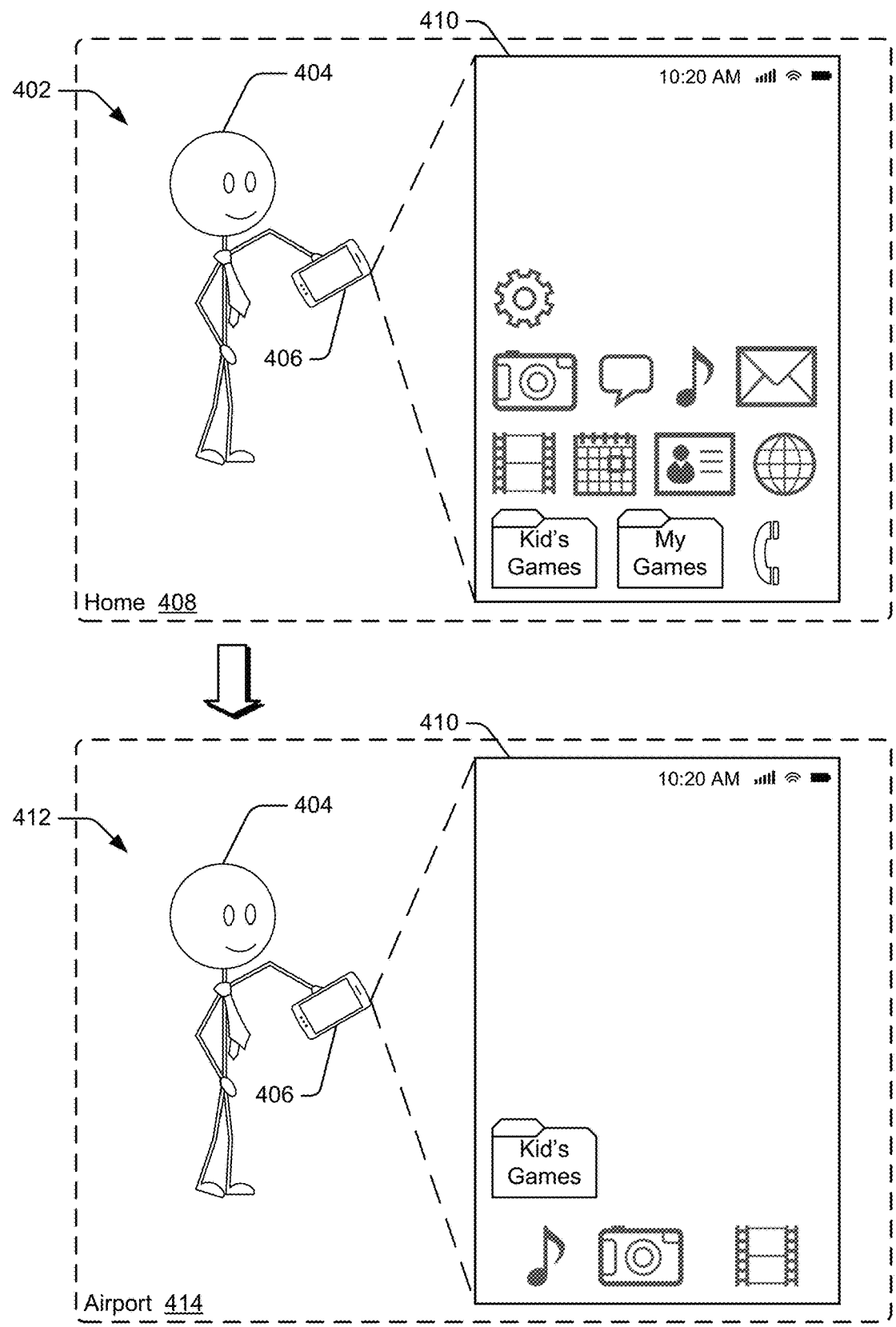

FIG. 4 illustrates another example operation of the techniques discussed herein. At 402 a user 404 is illustrated with a computing device 406 that is a smartphone. The user 404 is not wearing a wearable device. At 402 the computing device 406 is unlocked and a current location of the computing device 406, illustrated as home 408, is a safe location for making user-selectable content visible on a display screen of the computing device 406, so the computing device 406 is operating in a full content visibility mode. As illustrated by display screen 410, in the full content visibility mode all user-selectable content on the computing device is visible on the display screen 410. The user-selectable content is illustrated as two folders labelled "Kid's Games" and "My Games", as well as several icons that represent applications or operating system programs that can be selected by the user 404 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 412 the user is illustrated at a later time than at 402. At 412 the computing device 406 is unlocked but a current location of the computing device 406, illustrated as an airport 414, is not a safe location for making user-selectable content visible on a display screen of the computing device 406. Accordingly, the computing device 406 is operating in a reduced content visibility mode. As illustrated by display screen 410, in the reduced content visibility mode a reduced subset of user-selectable content is visible on the display screen 410. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 410, the gear icon, the speech balloon icon, the envelope icon, the calendar icon, the business card icon, the globe icon, and the telephone handset icon are not displayed. Without these icons being displayed, the user 404 is unable to select these icons and run the settings program, the texting application, the email application, the calendaring program, the contact list program, the web browser, and the telephone communication program, respectively.

Figure 5:
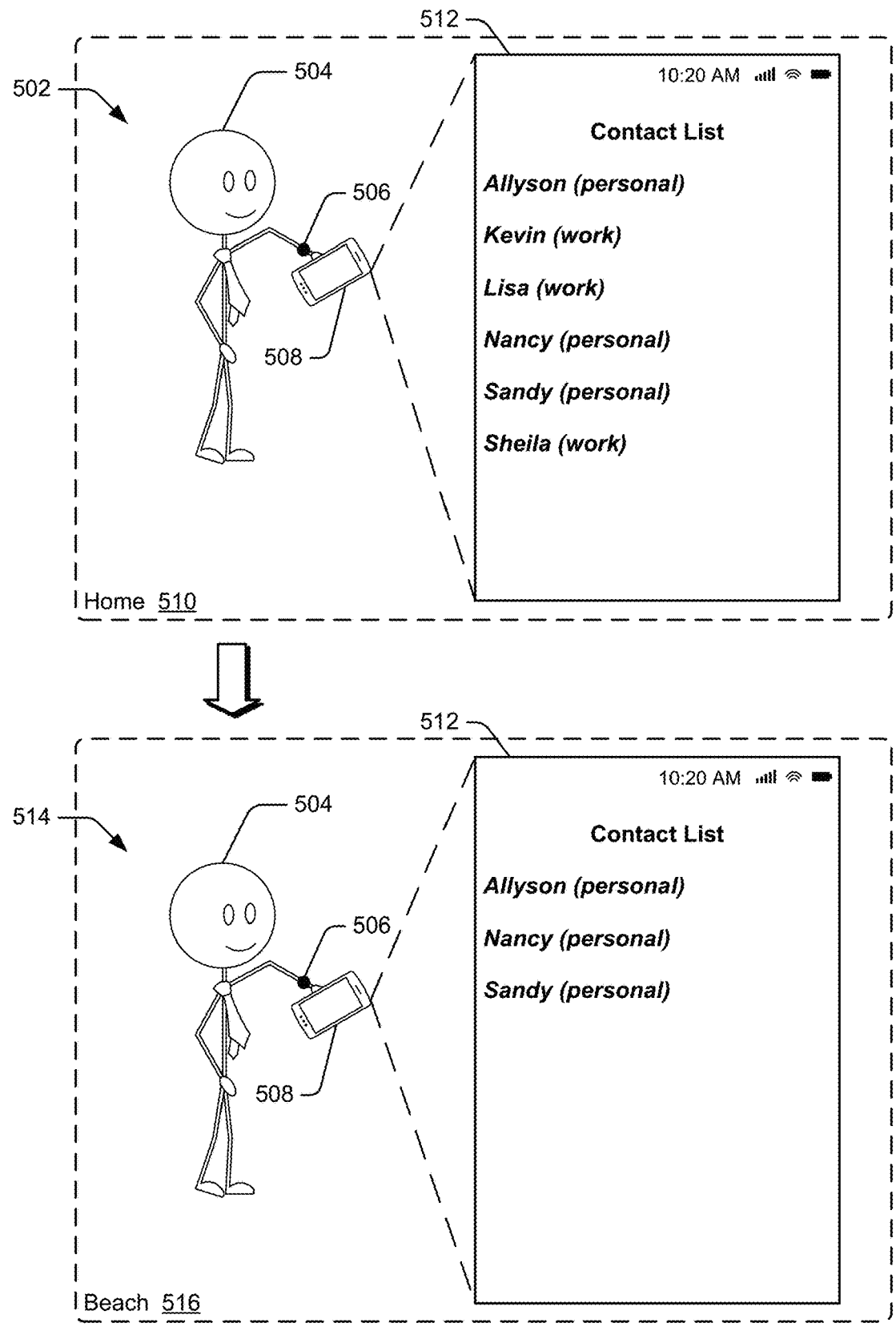

FIG. 5 illustrates another example operation of the techniques discussed herein. At 502, the user 504 wearing a wearable device 506, illustrated as a smartwatch, has a computing device 508 illustrated as a smartphone, is illustrated. At 502 the computing device 508 is unlocked and a current location of the computing device 508, illustrated as home 510, is a safe location for making user-selectable content visible on a display screen of the computing device 512, so the computing device 508 is operating in a full content visibility mode. As illustrated by display screen 512, in the full content visibility mode all user-selectable content on the computing device is visible on the display screen 512. The user-selectable content is illustrated as a contacts list and an individual's name can be selected by the user to display various contact information regarding the individual (e.g., phone numbers, email addresses, mailing addresses), to contact an individual (e.g., call a phone number, send a text message). The contacts list includes various names and an indication of whether the individual is a personal or work contact.

At 514 the user is illustrated at a later time than at 502, still wearing the wearable device 506. At 514 the computing device 508 is unlocked, but the current location of the computing device 508, illustrated as the beach 516, is not a safe location for making user-selectable content visible on a display screen of the computing device 508. Accordingly, at 514 the computing device 508 is operating in a reduced content visibility mode. As illustrated by display screen 512, in the reduced content visibility mode a reduced subset of user-selectable content is visible on the display screen 512. The user-selectable content is illustrated as a contacts list that includes only personal contacts, not work contacts. Without these contacts being displayed, the user 504 is unable to select these contacts and obtain contact information for, or contact, the work contacts.

Returning to FIG. 1, it should be noted that whether a computing device 102 is operating in a full content visibility mode or a reduced content visibility mode can be based on one or both of whether a wearable device 104 is in close proximity to the computing device 102 and whether a current location of the computing device 102 is a safe location for making user-selectable content visible on a display screen of the computing device 102. For example, as illustrated in FIGS. 2 and 3, whether the computing device 208, 308 is operating in a full content visibility mode or a reduced content visibility mode is based on whether the wearable device 206, 306 is in close proximity to the computing device 208 when unlocked. Whether a current location of the computing device 208, 308 (and optionally the user is authenticated to the wearable device 206, 306, or the user is wearing the wearable device 206, 306, or the user is both authenticated to the wearable device 206, 306 and wearing the wearable device 206, 306) is a safe location for making user-selectable content visible on a display screen of the computing device 208, 308 need not factor into whether the computing device 208, 308 is operating in a full content visibility mode or a reduced content visibility mode. By way of another example, as illustrated in FIGS. 4 and 5, whether the computing device 406, 508 is operating in a full content visibility mode or a reduced content visibility mode is based on a whether a current location of the computing device 406, 508 is a safe location for making user-selectable content visible on a display screen of the computing device 406, 508. Whether the wearable device 506 is in close proximity to the computing device 406, 508 need not factor into whether the computing device 406, 508 is operating in a full content visibility mode or a reduced content visibility mode.

However, whether a computing device 102 is operating in a full content visibility mode or a reduced content visibility mode can be based on both whether a wearable device 104 is in close proximity to the computing device 102 (and optionally the user is authenticated to the wearable device 104, or the user is wearing the wearable device 104, or the user is both authenticated to the wearable device 104 and wearing the wearable device 104) and whether a current location of the computing device 102 is a safe location for making user-selectable content visible on a display screen of the computing device 102. For example, the computing device 102 operates in the full content visibility mode in response to a wearable device 104 being in close proximity to the computing device 102 (and optionally the user is authenticated to the wearable device 104, or the user is wearing the wearable device 104, or the user is both authenticated to the wearable device 104 and wearing the wearable device 104) and a current location of the computing device 102 being a safe location for making user-selectable content visible on a display screen of the computing device 102. However, the computing device 102 operates in a reduced content visibility mode in response to a wearable device 104 not being in close proximity to the computing device 102 (or optionally not worn by or the user is not authenticated to the wearable device) or a current location of the computing device 102 not being a safe location for making user-selectable content visible on a display screen of the computing device 102.

Figure 6:
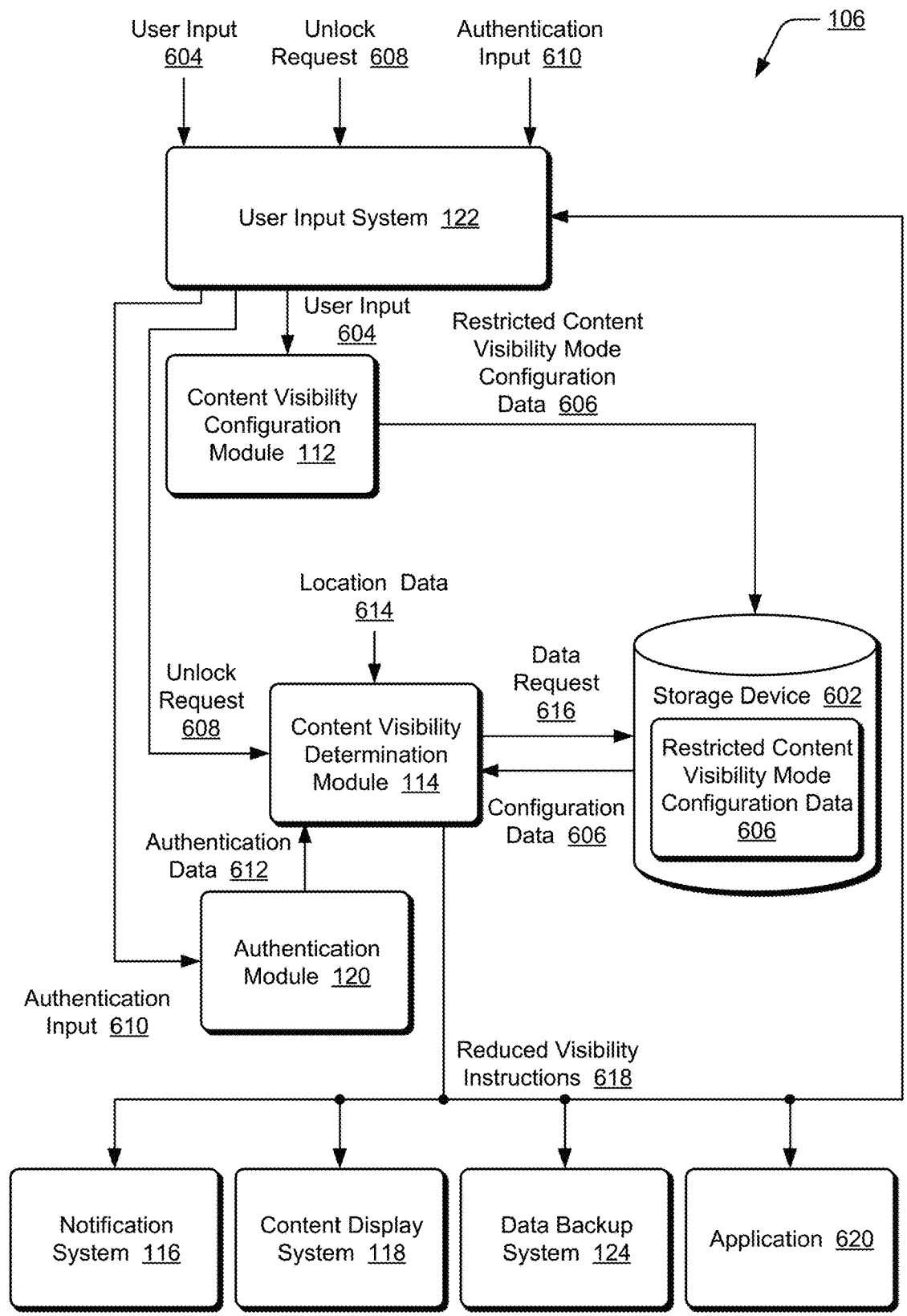
FIG. 6 illustrates some components of a content visibility control system in additional detail.

FIG. 6 illustrates some components of the content visibility control system 116 in additional detail. The content visibility control system 106 includes the content visibility configuration module 112, the content visibility determination module 114, the notification system 116, the content display system 118, the authentication module 120, the user input system 122, the data backup system 124, and a storage device 602. The storage device 602 can be any of a variety of different storage devices or components, such as random access memory (RAM), Flash memory, magnetic disk, and so forth.

The user input system 122 receives inputs of a user to the computing device 102. These inputs can take any of a variety of forms, such as gesture inputs to a touchscreen, touching or tapping inputs to a touchscreen, text inputs to a touchscreen or keypad, audible inputs, cursor control inputs, and so forth.

The content visibility configuration module 112 configures the reduced content visibility mode. Configuring the reduced content visibility mode refers to specifying which user-selectable content is not intelligibly displayed in the reduced content visibility mode. The remaining user-selectable content that is intelligibly displayed in the reduced content visibility mode is referred to as being in the reduced subset of user-selectable content. Not intelligibly displaying user-selectable content in the reduced content visibility mode can be controlled in various manners, such as not displaying the content on the computing device screen, blurring or scrambling the content on the device screen, and so forth as discussed in more detail below.

The user-selectable content refers to content that can be selected by the user. For example, the user-selectable content can include applications or programs that can be executed in response to a user input (e.g., of an icon representing the application or program, inputting of a gesture to run the application or program, selection of a menu item to run the application or program). By way of another example, user-selectable content can include notifications, alerts, and updates associated with applications or programs that can be executed in response to a user input. By way of another example, the user-selectable content can include individual contacts in an address book. By way of another example, the user-selectable content can include photographs, movies, songs, and so forth that can be played back by a media player on the computing device. By way of another example, the user-selectable content can include settings or preferences for the computing device 102 that a user can select (e.g., background images, wallpapers, lock screen images).

The user-selectable content that is in the reduced subset of user-selectable content can be specified in any of a variety of different manners. In one or more implementations, the user input system 122 receives user input 604 specifying the user-selectable content that is not to be intelligibly displayed in the reduced content visibility mode, and provides the user input 604 to the content visibility configuration module 112. For example, the content visibility configuration module 112 can display a list of user-selectable content and the user can specify (e.g., by touching the content in the list, by selecting buttons or check boxes associated with the content in the list, and so forth) which content is not to be intelligibly displayed in the reduced content visibility mode.

Additionally or alternatively, the content that is not to be intelligibly displayed in the reduced content visibility mode can be specified in other manners. For example, the content visibility configuration module 112 can obtain a default set of content that is not to be intelligibly displayed in the reduced content visibility mode. This set of default content can be obtained from a local storage device (e.g., storage device 602) or a remote storage device (e.g., via the network 130 of FIG. 1).

By way of another example, the content visibility configuration module 112 can obtain a set of content that is not to be intelligibly displayed in the reduced content visibility mode from a wearable device 104. E.g., the wearable device can receive user input specifying the user-selectable content that is not to be intelligibly displayed in the reduced content visibility mode, and provide an indication of the specified user-selectable content to the computing device 102 (e.g., the content visibility configuration module 112).

The content visibility configuration module 112 saves configuration data identifying the content in the reduced subset of user-selectable content to the storage device 602, illustrated as reduced content visibility mode configuration data 606. Additionally or alternatively, the reduced content visibility mode configuration data 606 can be stored in a remote storage device (e.g., a wearable device 104, or a storage device accessed via the network 130). The reduced content visibility mode configuration data 606 can identify the content in the reduced subset of user-selectable content in various manners. For example, the content in the reduced subset of user-selectable content can be a list or other record of the user-selectable content that is to be intelligibly displayed in the reduced content visibility mode.

In one or more embodiments, the content visibility determination module 114 determines whether a wearable device 104 associated with the computing device 102 is in close proximity to the computing device 102. In one or more embodiments, this determination is made in response to an unlock request 608 received by the user input system 122 and provided to the content visibility determination module 114. The unlock request 608 is a request to unlock the computing device 102, and can be an explicit request from the user, such as pushing a button on the computing device 102, inputting a gesture on a touchscreen of the computing device 102, and so forth. The user also optionally provides an authentication input 610 to the user input system 122, which is information used to authenticate the user. The user input system 122 provides the authentication input 610 to the authentication module 120. The authentication input 610 can be any of a variety of authentication information, such as PIN, a name and password, a scanned fingerprint, a scanned face or eye, voice, and so forth. Additionally or alternatively, the user can provide the authentication input 610 to the wearable device 104, which in turn provides the received authentication input 610 to the authentication module 120.

The authentication module 120 receives the authentication input 610 and attempts to authenticate the user. The authentication module 120 authenticates the user by comparing the authentication input 610 to known authentication data for the user. The authentication module 120 provides authentication data 612 to the content visibility determination module 114 indicating whether the user is authenticated. The authentication module 120 unlocks the computing device 102 in response to the user being authenticated, and does not unlock the computing device 102 in response to the user not being authenticated. If the authentication module 120 does not unlock the computing device 102 (so the computing device 102 remains locked), a lock screen is displayed to the user and optionally minimal functionality is made available, such as access to make an emergency phone call or use a camera application. However, this lock screen is separate from the reduced content visibility mode, which is enabled when the computing device 102 is unlocked.

Additionally or alternatively, the authentication input 610 can be provided as part of the unlock request 608. For example, the placing of a finger on a fingerprint sensor of the computing device 102 may serve as both the unlock request 608 and the authentication input 610. By way of another example, wearable device 104 can provide a signal (e.g., a wireless key beacon) to the computing device 102 when the wearable device 104 is within communication range of the computing device 102. This signal can serve as the unlock request 608 and the authentication input 610 (e.g., the signal can include a PIN, password, or other information used by the authentication module 120 to authenticate the user), and the authentication module 120 unlocks the computing device 102 in response to receipt of the signal from the wearable device 104. Thus, in such situations, the computing device 102 is unlocked simply by the wearable device 104 being within communication range of the computing device 102.

The content visibility determination module 114 can determine whether a wearable device 104 associated with the computing device 102 is in close proximity to the computing device 102 in a variety of different manners. In one or more embodiments, a wearable device 104 being in close proximity to the computing device 102 refers to the wearable device 104 being within a threshold distance of the computing device 102. This threshold distance can vary, and is optionally user-configurable. This threshold distance can also vary based on the computing device 102 (e.g., 2 feet if the computing device 102 is a smartphone, 10 feet if the computing device 102 is a desktop computer). For example, this threshold distance can range from 2 feet to 10 feet.

In one or more embodiments, the wearable device 104 is determined to be in close proximity to the computing device 102 if the wearable device 104 is within range to communicate with the computing device 102 using a particular communication protocol (e.g., Bluetooth, Bluetooth Low Energy).

Additionally or alternatively, the distance between the wearable device 104 and the computing device 102 can be determined. This distance between the wearable device 104 and the computing device 102 can be determined in a variety of different manners. For example, global positioning system (GPS) coordinates can be obtained by the wearable device 104 and provided to the content visibility determination module 114, which also receives GPS coordinates obtained by the computing device 102. The content visibility determination module 114 compares the two GPS coordinates and determines a distance between them.

Additionally or alternatively, rather than relying on the wearable device 104 being within a threshold distance of the computing device 102, the content visibility determination module 114 can determine whether the wearable device 104 is in close proximity to the computing device 102 in various other manners. For example, the wearable device 104 can detect a signal such as a beacon (e.g., a nearby location beacon) and provide the location indicated in that beacon (or an identifier of the signal) to the computing device 102. The content visibility determination module 114 determines that, if the computing device 102 detects a signal from a location beacon indicating the same location as in the signal detected by the wearable device 104 (or detects the same signal as the wearable device 104), then the wearable device 104 is in close proximity to the computing device 102.

By way of another example, the wearable device 104 can detect a wireless signal (e.g., Wi-Fi signal) having a particular identifier (e.g., basic service set identifier (BSSID)) and signal strength (e.g., received signal strength indicator (RSSI) value). The wearable device 104 communicates that wireless signal identifier and signal strength to the computing device 102. The computing device 102 can also detect a wireless signal having a particular identifier and signal strength. The content visibility determination module 114 determines that, if the wearable device 104 and the computing device 102 both detect a wireless signal having the same particular identifier and signal strength, then the wearable device 104 is in close proximity to the computing device 102.

By way of another example, one of the wearable device 104 and the computing device 102 can emit a sound (e.g., voice frequency or ultrasound). If the other of the wearable device 104 and the computing device detects the sound, then the wearable device 104 is in close proximity to the computing device 102.

By way of another example, both the wearable device 104 and the computing device 102 can detect various sensory data, such as sounds or motions. The wearable device 104 and the computing device 102 can share the sensory data they have detected with each other. The content visibility determination module 114 compares the sensory data (e.g., indications of sounds or motions) that the wearable device 104 detected to the sensory data that the computing device 102 detected and determines that the wearable device 104 is in close proximity if the wearable device 104 detects the same sensory data (e.g., the same sounds, the same motions, the same location) as the computing device 102 detects.

Thus, the content visibility determination module 114 determines whether the wearable device 104 is in close proximity to the computing device 102. Furthermore, in one or more embodiments, the content visibility determination module 114 also determines whether the user is authenticated to the wearable device 104. The user is authenticated to the wearable device 104 by comparing an authentication input to known authentication data for the user. The wearable device 104 itself can authenticate the user and notify the content visibility determination module 114 that the user has been authenticated to the wearable device 104. Additionally or alternatively, the wearable device 104 can provide received authentication inputs (e.g., fingerprint scan, password, voice) to the authentication module 120 and the authentication module 120 can authenticate the user. The user can be authenticated to the wearable device 104 using any of a variety of different authentication mechanisms, such as a fingerprint sensor, face recognition, iris recognition, voice recognition, password or PIN, and so forth. If the user is authenticated to the wearable device 104 and the wearable device 104 is in close proximity to the computing device 102, the computing device 102 operates in the full content visibility mode. However, if the user is not authenticated to the wearable device 104 or the wearable device 104 is not in close proximity to the computing device 102, the computing device 102 operates in the reduced content visibility mode.

Additionally or alternatively, the content visibility determination module 114 also determines whether the wearable device 104 is being worn by a user (e.g., as opposed to just resting on a table). The wearable device 104 itself can determine whether the wearable device 104 is being worn by a user, and provides an indication of that determination to the content visibility determination module 114. Additionally or alternatively, the wearable device 104 can provide received sensor inputs to the content visibility determination module 114 and the content visibility determination module 114 can determine whether the wearable device 104 is being worn by the user. Whether the wearable device 104 is being worn by a user can be determined in various different manners, such as sensing a heart rate, sensing a particular temperature (e.g., between 98 degrees Fahrenheit and 100 degrees Fahrenheit), capacitance detecting skin conductivity, detecting motion consistent with arm movements (e.g., in situations where the wearable device 104 is worn on the user's arm or hand), and so forth. By way of example, if the user is authenticated to the wearable device 104 and the wearable device 104 is in close proximity to the computing device 102 and being worn by the user, the computing device 102 operates in the full content visibility mode. However, if the user is not authenticated to the wearable device 104 or the wearable device 104 is not in close proximity to the computing device 102 or the wearable device 104 is not being worn by the user, the computing device 102 operates in the reduced content visibility mode.

It should be noted that once the user is authenticated to the wearable device 104, the user need not re-authenticate himself or herself as long as the wearable device 104 continues to be worn by the user. For example, the wearable device 104 is monitored (e.g., by the wearable device 104 itself or the authentication module 120) via motion (e.g., a continuous wearability sensor). Once the wearable device 104 is worn and motion or micro motion is taking place, the user is authenticated to the wearable device 104. As long as the wearable device 104 remains worn, the user need not be re-authenticated to the wearable device 104, and the wearable device 104 results in the computing device 102 operating in full content visibility mode. However, if the wearable device 104 ceases to be detected as worn (e.g., the wearable device 104 is lost or no motion is detected), the computing device 102 operates in reduced content visibility mode until the user is again authenticated to the wearable device 104.

In response to the computing device 102 being unlocked and the wearable device 104 that is associated with the computing device 102 being in close proximity to the computing device 102 (and optionally the user is authenticated to the wearable device 104, or the user is wearing the wearable device 104, or the user is both authenticated to the wearable device 104 and wearing the wearable device 104), the content visibility determination module 114 determines that the computing device 102 is to operate in the full content visibility mode. The content visibility determination module 114 need take no further action at this point as all user-selectable content is able to be displayed to the user. However, the content visibility determination module 114 does continue to monitor that the wearable device 104 remains in close proximity to the computing device 102 (and optionally the user is authenticated to the wearable device 104, or the user is wearing the wearable device 104, or the user is both authenticated to the wearable device 104 and wearing the wearable device 104). If the content visibility determination module 114 determines that the wearable device 104 is no longer in close proximity to the computing device 102 (or optionally the user is no longer authenticated to the wearable device 104 or the user is no longer wearing the wearable device 104), the computing device determination module 114 determines that the computing device is to operate in the reduced content visibility mode. In response to such a determination, the content visibility determination module 114 sends out reduced visibility instructions 618 indicating to the systems 116, 118, 122, 124, and optionally application 620, to operate in the reduced content visibility mode as discussed in more detail below.

In one or more embodiments, the content visibility determination module 114 maintains a record of whether the computing device 102 is currently running in the full content visibility mode or the reduced content visibility mode, allowing other programs or applications to query the content visibility determination module 114 to determine whether the computing device 102 is currently running in the full content visibility mode or the reduced content visibility mode.

Additionally or alternatively, the content visibility determination module 114 determines whether a current location of the computing device 102 is a safe location for making user-selectable content visible on a display screen of the computing device 102. This determination can be made in response to the unlock request 608 received by the user input system 122 and provided to the content visibility determination module 114. This determination can be made with or without the wearable device 104 being in close proximity to the computing device 102. In such situations, the content visibility determination module 114 receives location data 614 from one or more sensors of the computing device 102 and/or the wearable device 104, and determines based at least in part on the location data 614 whether the current location of the computing device 102 is a safe location for making user-selectable content visible on a display screen of the computing device.

The location data 614 can be received from various sources. In one or more embodiments, the location data 614 is received from one or more sensors in the computing device 102. Additionally or alternatively, the location data 614 is received from the wearable device 104 (which itself obtains the location data 614 from one or more sensors in the wearable device 104). These sensors can be used to detect, for example GPS coordinates, wind noise, car noise, street noise, locations at the beach, locations at the mall, and so forth. The location data 614 can take various different forms.

In one or more embodiments, the location data 614 identifies a geographic location of the computing device 102. For example, the location data 614 can be GPS coordinates received from a GPS receiver in the computing device 102 and/or the wearable device 104. By way of another example, the location data 614 can be a wireless signal (e.g., Wi-Fi signal) having a particular identifier (BSSID) and signal strength (e.g., RSSI value), which the content visibility determination module 114 can compare to known geographic locations of wireless signals having particular identifiers and signal strengths to determine the geographic location of the computing device 102.

Additionally or alternatively, the location data 614 refers to the context of the computing device 102 (e.g., the environment or setting in which the computing device 102 is situated). For example, given location data 614 from sensors on the wearable device 104 and/or the computing device 102, the content visibility determination module 114 can detect whether the computing device 102 is in a public setting or a private setting. This detection can be performed in various manners, such as based on a noise level of sounds captured by a microphone (e.g., if the noise level of sounds captured by a microphone exceeds a threshold value, such as 80 decibels, then the computing device 102 is in a public setting, otherwise the computing device 102 is in a private setting). This detection can also be based on a number of different voices captured by a microphone (e.g., if a number of different voices captured by a microphone exceeds a threshold value, such as 2, then the computing device 102 is in a public setting, otherwise the computing device 102 is in a private setting). This detection can also be based on a number of different faces captured by a camera of the computing device 102 (e.g., if a number of different faces captured by the camera exceeds a threshold value, such as 2, then the computing device 102 is in a public setting, otherwise the computing device 102 is in a private setting). This detection can also be based on whether any unknown faces are detected within a threshold distance of the computing device 102 (e.g., if at least one unknown face is detected within a threshold distance of the computing device 102, such as 2 feet, then the computing device 102 is in a public setting, otherwise the computing device 102 is in a private setting). This detection can also be based on many faces other than the user's face are detected within a threshold distance (e.g., if at least a threshold number, such as 3, faces other than the user's face are detected within a threshold distance, such as 2 feet of the computing device 102 then the computing device 102 is in a public setting, otherwise the computing device 102 is in a private setting). This detection can also be based on a number of device signatures (e.g., Wi-Fi signatures, Bluetooth signatures) that are detected by the computing device 102 (e.g., if at least a threshold number, such as 3, device signatures are detected then the computing device is in a public setting, otherwise the computing device 102 is in a private setting).

The content visibility determination module 114 can apply various different rules or criteria to the location data 614 to determine whether the computing device 102 is in a safe location for making user-selectable content visible on a display screen of the computing device 102. Any of a variety of different logical operators can be used to combine the various rules and criteria. For example, the content visibility determination module 114 can determine that the computing device 102 is not in a safe location for making user-selectable content visible if the computing device 102 is in a strange area. A strange area refers to a geographic location that the computing device 102 has not been in before, or a geographic location not within a threshold distance, such as 0.5 miles, of a geographic location that the computing device 102 has been in before. By way of another example, the content visibility determination module 114 can determine that the computing device 102 is in a safe location for making user-selectable content visible if the computing device 102 is at home (e.g., a geographic location or received wireless signal that the user has specified as home, the geographic location or received wireless signal that where the wearable device 104 determines the user typically sleeps).

The presence of people other than the user around the computing device 102 can also be used to determine whether the computing device 102 is in a safe location for making user-selectable content visible. For example, the content visibility determination module 114 can determine that the computing device 102 is not in a safe location for making user-selectable content visible if the noise level of sounds captured by a microphone exceeds a threshold value (e.g., 80 decibels), if a number of different voices captured by a microphone exceeds a threshold value (e.g., 2), if a number of different faces captured by a camera exceeds a threshold value (e.g., 2), whether any unknown faces are within a threshold distance (e.g., 2 feet) of the computing device 102, whether more than a threshold number (e.g., 3) faces other than the user's face are detected within a threshold distance (e.g., 2 feet) of the computing device 102, and so forth.

The content visibility determination module 114 can also factor in time to determine whether the computing device is in a safe location for making user-selectable content visible. For example, the content visibility determination module 114 can determine that the computing device 102 is not in a safe location for making user-selectable content visible if the computing device 102 is in a strange area (e.g., a geographic location that the computing device has not been in before, a geographic location not within a threshold distance, such as 0.5 miles, of a geographic location that the computing device has been in before) at a particular time or within a particular time range (e.g., between midnight and 5:00 AM), but that the computing device 102 is in a safe location for making user-selectable content visible if the computing device is in the strange area at other times (e.g., between 5:00 AM and midnight). By way of another example, the content visibility determination module 114 can determine that the computing device 102 is not in a safe location for making user-selectable content visible if the person using the phone (e.g., based on a phase detected by an image capture device or a voice detected by a microphone) is not the owner of the computing device and has been using the computing device for at least a threshold amount of time (e.g., 1 hour).

Whether the computing device 102 is in a public setting or a private setting can also be used to determine whether the computing device 102 is in a safe location for making user-selectable content visible. For example, the content visibility determination module 114 can determine that the computing device 102 is in a safe location for making user-selectable content visible if the computing device 102 is in a private setting, and that the computing device 102 is not in a safe location for making user-selectable content visible if the computing device 102 is in a public setting. Whether the computing device 102 is in a private setting or a public setting can be determined in various manners using the location data 614. For example, different locations can be associated with private settings (e.g., home), and other locations can be associated with public settings (e.g., airports, gyms, beaches, restaurants, sports venues, etc.). In one or more embodiments, a geographic location can be associated with a private setting or a public setting in various manners. For example, the user can specify (e.g., to the computing device 102 or the wearable device 104) that a particular geographic location or a particular received wireless signal is associated with a particular setting (e.g., home, airport, gym). By way of another example, the content visibility determination module 114 can access a remote service (e.g., the wearable device 104 or a server via the network 126) to obtain a set of known geographic locations or received wireless signals associated with particular settings (e.g., airports, gyms, restaurants).

In response to the computing device 102 being unlocked and the current location of the computing device 102 being a safe location for making user-selectable content visible on a display screen of the computing device 102, the content visibility determination module 114 determines that the computing device 102 is to operate in the full content visibility mode. The content visibility determination module 114 need take no further action at this point as all user-selectable content is able to be displayed to the user. However, the content visibility determination module 114 does continue to monitor that the current location of the computing device 102 remains a safe location for making user-selectable content visible on a display screen of the computing device 102. If the content visibility determination module 114 determines that the current location of the computing device 102 is no longer a safe location for making user-selectable content visible on a display screen of the computing device 102, the computing device determination module 114 determines that the computing device is to operate in the reduced content visibility mode. In response to such a determination, the content visibility determination module 114 sends out reduced visibility instructions 618 indicating to the systems 116, 118, 122, 124, and optionally application 620, to operate in the reduced content visibility mode as discussed in more detail below.

The content visibility determination module 114 determines whether the computing device 102 is to operate in the reduced content visibility mode. This determination can be made in response to the unlock request 608 received by the user input system 122 and provided to the content visibility determination module 114 as discussed above. In response to the computing device 102 being unlocked and the wearable device 104 that is associated with the computing device 102 not being in close proximity to the computing device 102 (or optionally the user is not authenticated to the wearable device 104 or the user is not wearing the wearable device 104), the content visibility determination module 114 determines that the computing device 102 is to operate in the reduced content visibility mode. Additionally or alternatively, in response to the computing device 102 being unlocked and a current location of the computing device 102 not being a safe location for making user-selectable content visible on a display screen of the computing device 102, the content visibility determination module 114 determines that the computing device 102 is to operate in the reduced content visibility mode.

In one or more embodiments, in determining whether the computing device 102 is to operate in the reduced content visibility mode, the content visibility determination module 114 uses both a determination of whether a wearable device 104 associated with the computing device 102 is in close proximity to the computing device 102 (and optionally the user is authenticated to the wearable device 104, or the user is wearing the wearable device 104, or the user is both authenticated to the wearable device 104 and wearing the wearable device 104) and a determination of whether a current location of the computing device 102 is a safe location for making user-selectable content visible on a display screen of the computing device 102. For example, the content visibility determination module 114 determines that the computing device 102 is to operate in the full content visibility mode only if the computing device 102 is unlocked and the wearable device 104 that is associated with the computing device 102 is in close proximity to the computing device 102 (and optionally the user is authenticated to the wearable device 104, or the user is wearing the wearable device 104, or the user is both authenticated to the wearable device 104 and wearing the wearable device 104). However, if the computing device 102 is in a strange area (e.g., a geographic location that the computing device has not been in before) then the content visibility determination module 114 determines that the computing device 102 is to operate in the reduced content visibility mode regardless of whether the wearable device 104 that is associated with the computing device 102 is in close proximity to the computing device 102. User input (e.g., via a menu or other configuration setting) can be received to specify which has higher priority (e.g., the location of the computing device 102 or the wearable device 104 being in close proximity to the computing device 102).

In situations where the computing device 102 is to operate in the reduced content visibility mode, the content visibility determination module 114 submits a data request 616 to the storage device 602 for the reduced content visibility mode configuration data 606. The storage device 602 returns the reduced content visibility mode configuration data 606 to the content visibility determination module 114, which in turn generates and sends reduced visibility instructions 618 to the notification system 116, the content display system 118, the data backup system 124, and optionally one or more applications 620.

The reduced visibility instructions 618 indicate that the computing device 102 is operating in the reduced content visibility mode and further identify the reduced subset of user-selectable content. Additionally or alternatively, one or more of the systems 116, 118, 122, 124, and/or application 620 can already be programmed (or have access to data, such as reduced content visibility mode configuration data 606 in storage device 602) with an indication of the reduced subset of user-selectable content. In such situations, the reduced visibility instructions 618 need not identify the reduced subset of user-selectable content.

Each of the notification system 116, the content display system 118, and the user input system 122 can use the reduced visibility instructions 618 as appropriate to ensure that only the content in the reduced subset of user-selectable content is intelligibly displayed. The operation of the notification system 116, the content display system 118, and the user input system 122 based on the reduced visibility instructions 618 is discussed in more detail below.

The content display system 118 manages the display of content on the display screen of the computing device 102. In one or more embodiments, in response to receipt of the reduced visibility instructions 618, the content display system 118 ceases displaying identifiers of the user-selectable content that is not in the reduced subset of user-selectable content. The content display system 118 optionally displays user-selectable content on different pages, allowing the user to scroll or otherwise switch to different pages. This ceasing display identifiers of user-selectable content can be performed in different manners, such as not displaying particular identifiers on a page, not displaying particular pages, and so forth.

For user-selectable content that is an application or program not in the reduced subset of user-selectable content, the content display system 118 takes various actions to ensure user-selectable identifiers of the application or program are not displayed. For example, icons or widgets representing the application or program are not displayed, and menus do not display the name of the application or program. By way of another example, files that are associated with the application or program and user selection of which would cause the application or program to execute are not displayed (e.g., icons representing files containing photographs that, if selected, would cause the application or program to execute are not displayed).

For other types of user-selectable content not in the reduced subset of user-selectable content, the content display system 118 takes various actions to ensure the user-selectable content is not displayed. For example, icons representing files containing photographs (or videos, music, etc.) not in the reduced subset of user-selectable content are not displayed. By way of another example, names on a contact list that are not in the reduced subset of user-selectable content are not displayed. By way of another example images not in the reduced subset of user-selectable content are not displayed as background images, lock screen images, wallpaper, and so forth.

Additionally or alternatively, the content display system 120 can take different actions to not intelligibly display the content. For example, the content display system 120 can display the user-selectable content in a manner to make it unrecognizable to the user. E.g., icons or widgets representing applications, programs, or files can be blurred or scrambled, names on a contact list can be blurred or scrambled, and so forth.

As discussed above, the user input system 122 receives inputs of a user to the computing device 102. In response to receipt of the reduced visibility instructions 618, the user input system 122 ignores any user inputs to access user-selectable content that is not in the reduced subset of user-selectable content. Situations can arise where the user input system 122 receives user inputs referring to user-selectable content that is not in the reduced subset of user-selectable content even if no identifiers of that user-selectable content are displayed. For example, the user may input a verbal (or text) command to execute an application or program that is not in the reduced subset of user-selectable content, or the user may input a verbal (or text) command to call a contact that in the reduced subset of user-selectable content.

If the user input system 122 receives a user input to access user-selectable content that is not in the reduced subset of user-selectable content, the user input system 122 ignores the user input. For example, if the user input system 122 receives a verbal command to execute an application that is not in the reduced subset of user-selectable content, the user input system 122 identifies the application specified in the verbal command, determines that the application is not in the reduced subset of user-selectable content, and ignores the verbal command.

In one or more embodiments, content display system 118 suspends execution of user-selectable content that is an application or program not in the reduced subset of user-selectable content. Suspending execution of an application or program can be performed in various manners, such as communicating to a scheduler of the computing device 102 not to schedule the application or program for execution. Thus, user-selectable content that is an application or program not in the reduced subset of user-selectable content ceases to run on the computing device 102 while the computing device 102 is operating in the reduced content visibility mode. The content display system 118 can resume running such applications or programs (e.g., by communicating to the scheduler to resume scheduling the application or program for execution) when the computing device 102 resumes running in the full content visibility mode.

The notification system 116 provides various alerts, updates, and other notifications to the user of the computing device 102. In response to receipt of the reduced visibility instructions 618, the notification system 116 does not display, play back, or otherwise present any alerts, updates, or other notifications for applications or programs that are not in the reduced subset of user-selectable content. For example, if a telephone application is not in the reduced subset of user-selectable content, then a notification of an incoming phone call will not be displayed and no ring tone will be played. By way of another example, if a calendar application is not in the reduced subset of user-selectable content, then reminders of upcoming meetings will not be displayed on the display screen of the computing device 102.

The data backup system 124 backs up new data to the cloud (e.g., to one or more servers via the network 130) in situations in which the wearable device 104 is operating in the reduced content visibility mode. Any new data received by the computing device 102 while the wearable device 104 is operating in the reduced content visibility mode is stored in the cloud. This new data can be any data input to the computing device 102 by a user (e.g., audible inputs, typed texts), captured photographs or videos, any data received at the computing device 102 from another computing device (e.g., text messages, emails). This allows the content visibility control system 106 to help protect the user from theft of his or her computing device 102. For example, photographs taken or email messages received may provide an indication of where a stolen computing device 102 is or who is in possession of the stolen computing device 102.

In one or more embodiments, the data backup system 124 stores new data to a secure location in the cloud that is associated with the owner (or an authorized user) of the computing device 102 (e.g., the user that was authenticated by the authentication module 120). However, the secure location cannot be accessed from the computing device 102 unless the wearable device 104 associated with the computing device 102 is in close proximity to the computing device 102 (and optionally the user is authenticated to the wearable device 104, or the user is wearing the wearable device 104, or the user is both authenticated to the wearable device 104 and wearing the wearable device 104), or the proper credentials (e.g., user name and password) are otherwise provided. The location in the cloud being secure refers to the location being private and accessible to the owner or authorized user (e.g., with a user name and password), and not being generally available to the public.

In one or more embodiments, when the computing device 102 is in the reduced content visibility mode, the content visibility determination module 114 continues to monitor that the wearable device 104 is not in close proximity to the computing device 102 (and optionally the user is authenticated to the wearable device 104, or the user is wearing the wearable device 104, or the user is both authenticated to the wearable device 104 and wearing the wearable device 104). If the content visibility determination module 114 determines that the wearable device 104 is in close proximity to the computing device 102 (and optionally that the user is authenticated to the wearable device 104, or the user is wearing the wearable device 104, or the user is both authenticated to the wearable device 104 and wearing the wearable device 104), the computing device determination module 114 determines that the computing device 102 is to operate in the full content visibility mode. In response to such a determination, the content visibility determination module 114 sends out new instructions (e.g., reduced visibility instructions 618 or similar instructions) indicating to the systems 116, 118, 122, 124, and optionally application 620, to operate in the full content visibility mode.

Additionally or alternatively, when the computing device 102 is in the reduced content visibility mode, the content visibility determination module 114 continues to monitor that the current location of the computing device 102 is not a safe location for making user-selectable content visible on a display screen of the computing device 102. If the content visibility determination module 114 determines that the current location of the computing device 102 is a safe location for making user-selectable content visible on a display screen of the computing device 102, the computing device determination module 114 determines that the computing device 102 is to operate in the full content visibility mode. In response to such a determination, the content visibility determination module 114 sends out new instructions (e.g., reduced visibility instructions 618 or similar instructions) indicating to the systems 116, 118, 122, 124, and optionally application 620, to operate in the full content visibility mode.

In one or more embodiments, the determination that the computing device 102 is to operate in the reduced content visibility mode can be overridden by the user, causing the computing device 102 to operate in the full content visibility mode. The user can override such determination in various manners, such as providing a user code (e.g., PIN, password, facial image, verbal input), using 2-factor authentication, and so forth. Thus, for example, if the wearable device 104 is not in close proximity to the computing device 102 (e.g., the user forgot to bring his smartwatch with him), full content visibility mode is still accessible to the user.

In some of the discussions above, the computing device 102 is discussed as being in reduced content visibility mode when the wearable device 104 associated with the user and the computing device 102 is not in close proximity to the computing device 102 (and optionally the user is authenticated to the wearable device 104, or the user is wearing the wearable device 104, or the user is both authenticated to the wearable device 104 and wearing the wearable device 104). Additionally or alternatively, the user can provide input to the wearable device 104 that is associated with the computing device 102 and is in close proximity to the computing device 102, the input causing the wearable device 104 to communicate a command to the computing device 102 to switch to the reduced content visibility mode. Similarly, the user can provide an additional input to the wearable device 104 that is associated with the computing device 102 and is in close proximity to the computing device 102, the additional input causing the wearable device 104 to communicate a command to the computing device 102 to switch to full content visibility mode (e.g., operating as a remote control/privacy toggle). These inputs can be provided to the wearable device 104 in various manners, such as selection of a physical button or switch on the wearable device 104, selection of button on a touchscreen, verbal inputs, and so forth. Effectively, these use of these inputs turns the wearable device 104 into a remote control device for the computing device 102, instructing the computing device 102 when to toggle between the reduced content visibility mode and the full content visibility mode.

Allowing the user to provide these inputs to the wearable device 104 that cause the wearable device 104 to send commands to the computing device 102 to toggle between the reduced content visibility and full content visibility modes gives the user of the wearable device 104 better control over the computing device 102. For example, a user may be using his or her computing device 102 when another individual approaches and the user wants to show the other individual something on the computing device 102 but does not want the other individual to see all the content on the computing device 102. The user can provide an input to the wearable device 104 to switch to the reduced content visibility mode, show the other individual what the user wants to, and then provide an input to the wearable device 104 to switch to the full content visibility mode.

Figure 7:
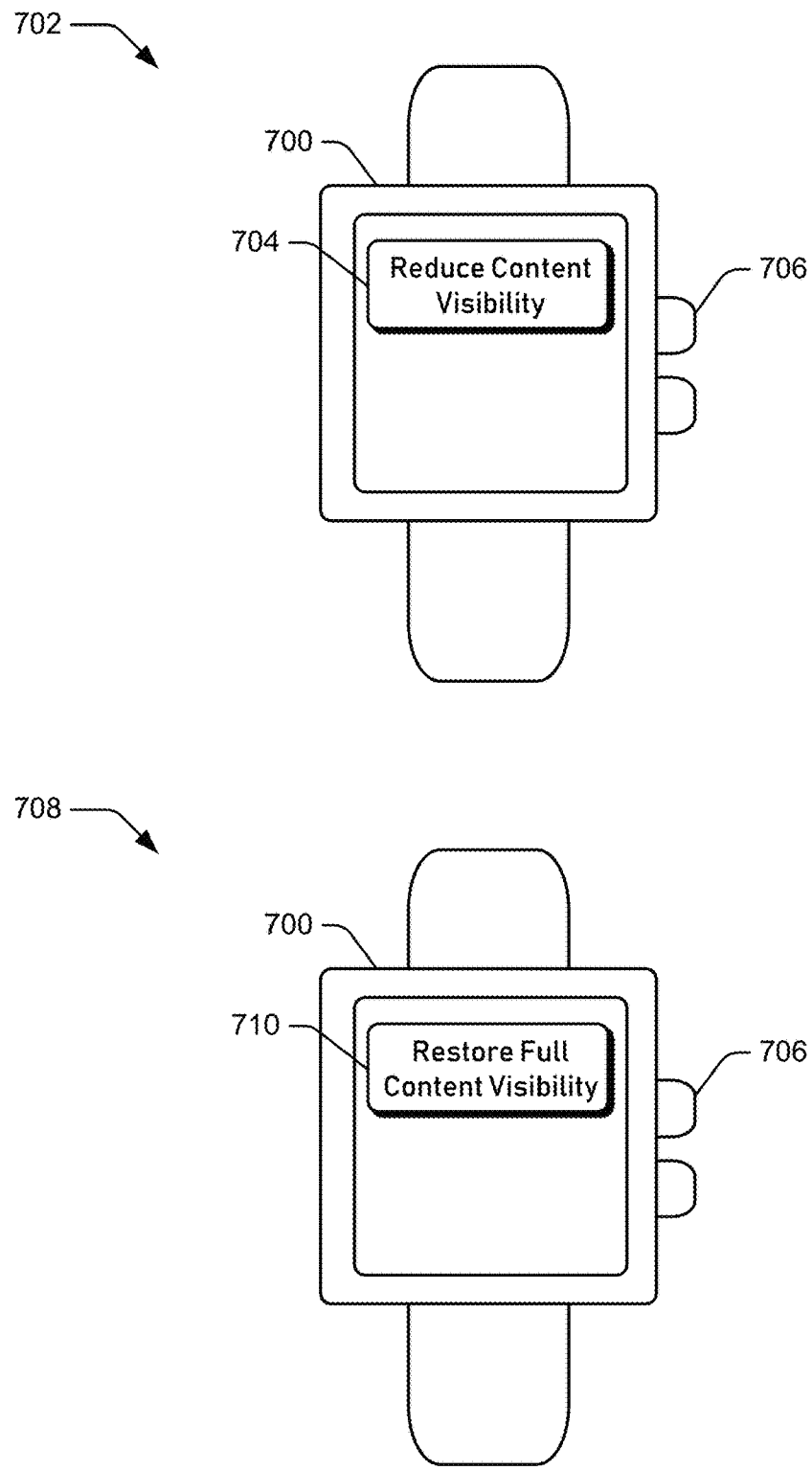
FIG. 7 illustrates an example of a wearable device supporting commands to toggle the computing device between reduced content visibility and full content visibility modes.

FIG. 7 illustrates an example of a wearable device 700 supporting commands to toggle the computing device 102 between reduced content visibility and full content visibility modes. At 702, the wearable device 700 is shown while the computing device 102 is in the full content visibility mode. In response to user selection of the "Reduce Content Visibility" button 704, the wearable device 104 sends a command to the computing device 102 to switch to the reduced content visibility mode. Additionally or alternatively, in response to the user pressing a physical button 706 the wearable device 104 sends a command to the computing device 102 to switch to the reduced content visibility mode.

At 708, the wearable device 700 is shown while the computing device 102 is in the reduced content visibility mode. In response to user selection of the "Restore Full Content Visibility" button 710, the wearable device sends a command to the computing device to switch to the full content visibility mode. Additionally or alternatively, in response to the user pressing the physical button 706 the wearable device sends a command to the computing device to switch to the full content visibility mode.

Although in the example of FIG. 7 both touchscreen buttons and physical buttons are shown, it should be noted that the wearable device 700 need not include both, and may include only touchscreen buttons or a physical button. Furthermore, "Reduce Content Visibility" and "Restore Full Content Visibility" are only examples, and various other buttons or labels could be used. For example, an "Airport Mode On" button can be selected to switch the computing device to the reduced content visibility mode, and an "Airport Mode Off" button can be selected to switch the computing device to the full content visibility mode.

Returning to FIG. 6, in the discussions above the content visibility control system 106 is discussed as supporting a single reduced content visibility mode—e.g., if the wearable device 104 is not in close proximity to the computing device 102 (and optionally the user is authenticated to the wearable device 104, or the user is wearing the wearable device 104, or the user is both authenticated to the wearable device 104 and wearing the wearable device 104), then the computing device 102 operates in the reduced content visibility mode. Additionally or alternatively, the content visibility control system 106 supports multiple reduced content visibility modes, and different content can be intelligibly displayed in each of these modes. Using multiple reduced content visibility modes, the computing device 102 can operate in one of the multiple reduced content visibility modes when a wearable device 104 associated with the user and the computing device 102 is in close proximity to the computing device 102 (and optionally the user is authenticated to the wearable device 104, or the user is wearing the wearable device 104, or the user is both authenticated to the wearable device 104 and wearing the wearable device 104). Which of multiple reduced content visibility modes the computing device 102 operates in can be determined based on various different factors, such as the user associated with the wearable device, the wearable device itself, a wearable device class that the wearable device belongs to, and so forth.

The content visibility configuration module 112 configures each of the reduced content visibility modes. This allows each individual one of the multiple reduced content visibility modes to be user-configured or configured based on a default set of content as discussed above. These multiple reduced content visibility modes can be different levels of reduced content visibility, some intelligibly displaying less user-selectable content than others. Reduced content visibility mode configuration data 606 is maintained for each of the multiple reduced content visibility modes. A correspondence between particular reduced content visibility mode configuration data 606 and who (e.g., a user) or what (e.g., a wearable device or class of wearable devices) the reduced content visibility mode configuration data 606 corresponds to is also maintained. This correspondence can be maintained in various different manners, such as a list or other record in storage device 602, metadata stored with each particular reduced content visibility mode configuration data 606 indicating to who or what the configuration data corresponds, and so forth. This correspondence allows the content visibility determination module 114 to know which particular reduced content visibility mode configuration data 606 to use given the current use of the computing device 102 (e.g., the user, the wearable device, the class of wearable device).

In one or more embodiments, different reduced content visibility mode configuration data 606 can be associated with each different user of the computing device 102. This allows different users providing different authentication inputs 610 to have different content intelligibly displayed when the computing device 102 is in the reduced content visibility mode. Users can also provide authentication inputs to a wearable device so that the wearable device can authenticate the user (e.g., based on known authentication data for the user maintained at the wearable device) and notify the computing device 102 which user is using the computing device 102.

Additionally or alternatively, different reduced content visibility mode configuration data 406 can be associated with each different wearable device 104 that is associated with the computing device 102. This allows different wearable devices 104 to have different content intelligibly displayed when the computing device 102 is in the reduced content visibility mode.

Additionally or alternatively, different types of wearable devices can be in different classes. The class of a wearable device can be determined, for example, by the wearable device identifying its class when the wearable device is paired with the computing device. Each class of wearable device corresponds to particular reduced content visibility mode configuration data 606, allowing wearable devices having different classes to have different content intelligibly displayed when the computing device 102 is in the reduced content visibility mode. Thus, different reduced subsets of the user-selectable content are intelligibly displayed for different classes. Classes can be pre-defined, or a user of the computing device 102 can define his or her own classes (e.g., assigning the wearable device 104 to a class when the wearable device 104 is associated with the computing device 102). For example, classes can include an adult class, a teenager class, and a child class. By way of another example, classes can include a computing device owner class and a computing device non-owner class. By way of another example, classes can include a work class and a personal class.

In one or more embodiments, which of multiple reduced content visibility modes the computing device 102 operates in can also be determined based on whether a current location of the computing device 102 is a safe location for making user-selectable content visible on a display screen of the computing device 102. For example, the content visibility determination module 114 determines that the computing device 102 is to operate in a full content visibility mode if the computing device 102 is unlocked and the wearable device 104 that is associated with the computing device 102 (and optionally the user is authenticated to the wearable device 104, or the user is wearing the wearable device 104, or the user is both authenticated to the wearable device 104 and wearing the wearable device 104) is in close proximity to the computing device 102. However, if the computing device 102 is in a strange area (e.g., a geographic location that the computing device has not been in before) then the content visibility determination module 114 determines that the computing device 102 is to operate in a different level of reduced content visibility (e.g., the reduced content visibility mode in which the least amount of user-selectable content is visible) regardless of whether the wearable device 104 that is associated with the computing device 102 is in close proximity to the computing device 102. User input (e.g., via a menu or other configuration setting) can be received to specify which has higher priority (e.g., the location of the computing device 102 or the wearable device 104 being in close proximity to the computing device 102).

Furthermore, any of a variety of different logical operators can be used to combine the various rules and criteria discussed herein for determining whether a current location of the computing device 102 is a safe location for making user-selectable content visible on a display screen of the computing device 102. These various combinations of rules and criteria can also be used to determine which of multiple reduced content visibility modes the computing device 102 operates in. For example, the content visibility determination module 114 can determine that the computing device 102 is to operate in one level of reduced content visibility in response to the computing device 102 not being in strange area, but operate in another level of reduced content visibility (e.g., that intelligibly displays less user-selectable content to the user) in response to the computing device 102 being in a public setting.

Figure 8:
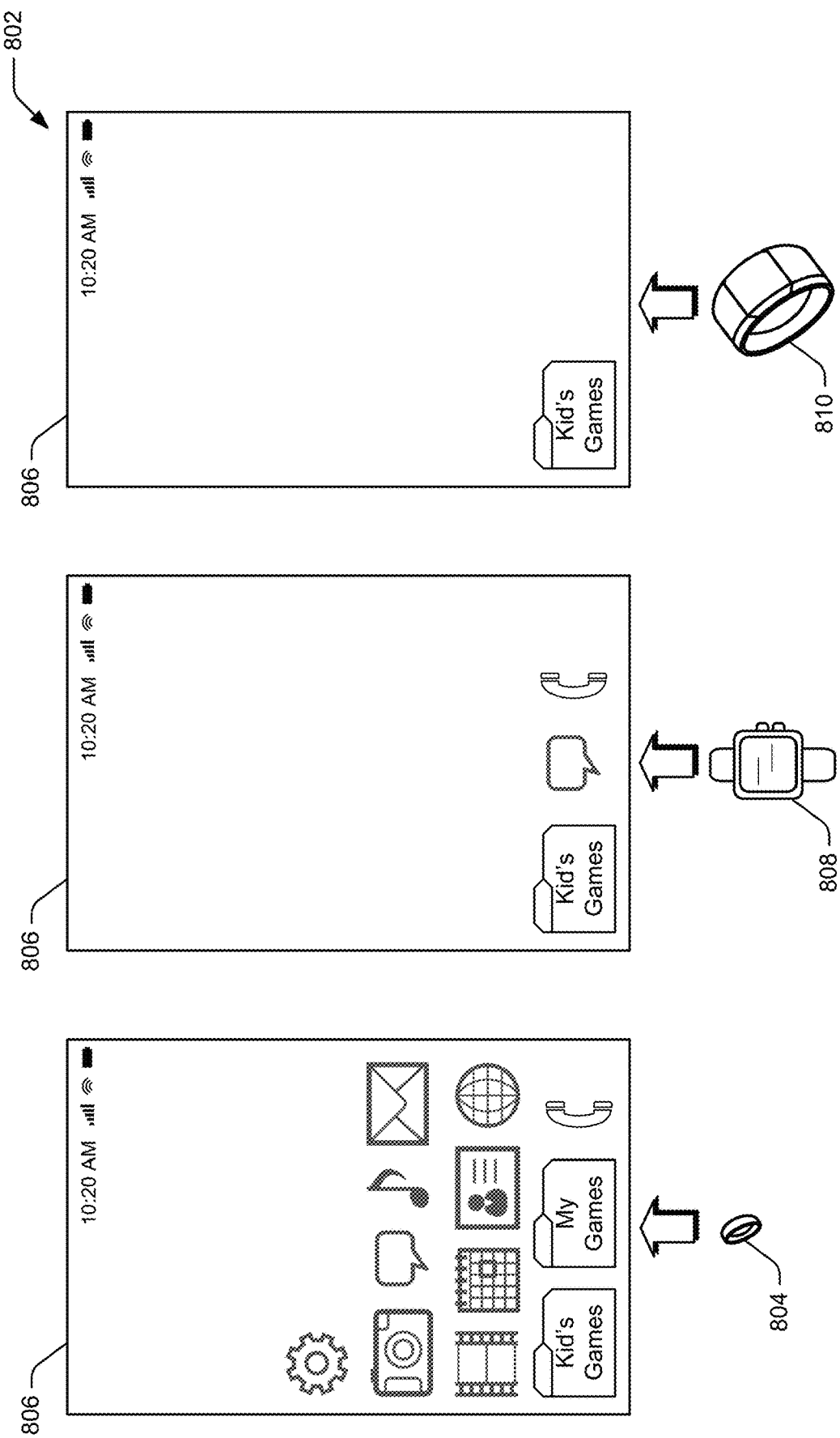
FIG. 8 illustrates another example of the operation of the techniques discussed herein.

FIG. 8 illustrates an example 802 of the operation of the techniques discussed herein. A wearable device 804, illustrated as a ring, is associated with the full content visibility mode. Accordingly, when the wearable device 804 is in close proximity to the computing device 102 (and optionally the user is authenticated to the wearable device 104, or the user is wearing the wearable device 104, or the user is both authenticated to the wearable device 104 and wearing the wearable device 104), all user-selectable content on the computing device is visible on the display screen 806. The user-selectable content is illustrated as two folders labelled "Kid's Games" and "My Games", as well as several icons that represent applications or operating system programs that can be selected by the user for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

Another wearable device 808, illustrated as a smartwatch, is associated with a first reduced content visibility mode. The first reduced content visibility mode makes content appropriate for teenagers visible. Accordingly, when the wearable device 808 is in close proximity to the computing device 102 (and optionally the user is authenticated to the wearable device 104, or the user is wearing the wearable device 104, or the user is both authenticated to the wearable device 104 and wearing the wearable device 104), a reduced subset of the user-selectable content is visible on the display screen 806. The user-selectable content is illustrated as a folder labelled "Kid's Games", a speech balloon icon representing a texting application, and a telephone handset icon representing a telephone communication program.

Another wearable device 810, illustrated as a bracelet, is associated with a second reduced content visibility mode. The second reduced content visibility mode makes content appropriate for young children visible. Accordingly, when the wearable device 810 is in close proximity to the computing device 102 (and optionally the user is authenticated to the wearable device 104, or the user is wearing the wearable device 104, or the user is both authenticated to the wearable device 104 and wearing the wearable device 104), a reduced subset of the user-selectable content is visible on the display screen 806. The user-selectable content is illustrated as a folder labelled "Kid's Games".

It should be noted that situations can arise in which multiple wearable devices are in close proximity to the same computing device at the same time, each of which is associated with a different content visibility mode. In such situations, the content visibility determination module 114 applies one or more rules to select one of the multiple content visibility modes. For example, the content visibility mode displaying the most user-selectable content can be selected. By way of another example, the content visibility mode displaying the least user-selectable content can be selected.

Returning to FIG. 6, in one or more embodiments the reduced visibility instructions 618 are also provided to one or more applications 620 on the computing device 102. This allows the application 620 to behave differently based on whether the computing device 102 is running in the reduced content visibility mode or the full content visibility mode. The application 620 can change its behavior in any of a variety of different manners. For example, the application 620 can automatically log a user into an account associated with the application 620 when in full content visibility mode (e.g., a service account allowing access to online content such as movies, songs, email), but not automatically log the user into the account associated with the application 620 when in reduced content visibility mode. By way of another example, various features of the application 620 may be activated when in full content visibility mode (e.g., encryption functionality, virtual private network (VPN) functionality, audio recording functionality, and so forth) but not activated when in reduced content visibility mode.

In one or more embodiments, the application changes behavior while running based on the reduced visibility instructions 618. For example, if the user requests to run the application 620 (e.g., by selecting an icon on the display screen of the computing device 102), the application 620 queries the content visibility determination module 114 for an indication of whether the computing device 102 is currently in the reduced content visibility mode or the full content visibility mode. If the computing device 102 is in the reduced content visibility mode then the application 620 does not automatically log the user into the account associated with the application 620. However, if a few minutes later the application 620 receives reduced visibility instructions 618 indicating that the computing device 102 is in the full content visibility mode, at that point the application 620 automatically logs the user into the account associated with the application 620.

On the other hand, if the computing device 102 is in the full content visibility mode 620 when the user requests to run the application 620, then the application 620 automatically logs the user into the account associated with the application 620. If a few minutes later the application 620 receives reduced visibility instructions 618 indicating that the computing device 102 is in the reduced content visibility mode, then the application 620 optionally logs the user out of the account associated with the application 620 and prompts the user to enter his or her credentials to access the account associated with the application 620.

Figure 9:
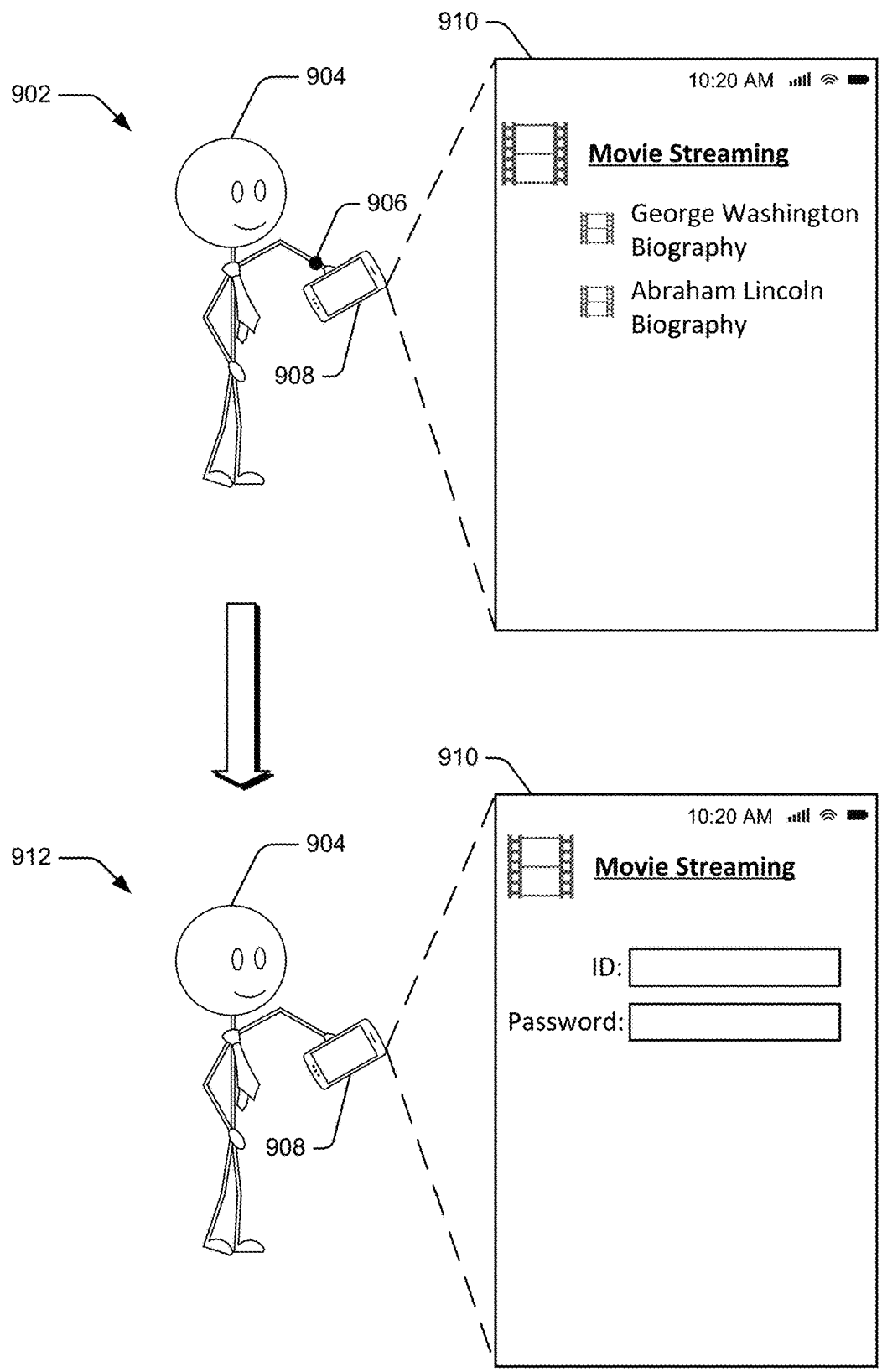
FIG. 9 illustrates an example operation of an application changing behavior.

FIG. 9 illustrates an example operation of an application changing behavior. At 902 a user 904 is illustrated. The user 904 is wearing a wearable device 906 illustrated as a smartwatch, and has a computing device 908 illustrated as a smartphone. At 902 the wearable device 906 is in close proximity to the computing device 908, so the computing device 908 is operating in the full content visibility mode. As illustrated by display screen 910, in the full content visibility mode an email application is displayed. When the user 904 selects to run the video playback application (e.g., by selecting the film strip icon illustrated in FIG. 2), the video playback application automatically logs the user 904 into his or her account using credentials for the user stored by the video playback application. Movies that the user 904 has purchased are available for viewing, illustrated as a George Washington Biography movie, and an Abraham Lincoln Biography movie.

At 912 the user is illustrated at a later time than at 902. At 912, the user 904 is no longer wearing the wearable device 906. Accordingly, at 912 the wearable device 906 is not in close proximity to the computing device 908, so the computing device 908 is operating in a reduced content visibility mode. As illustrated by display screen 910, in the reduced content visibility mode a login page prompting the user to enter his or her credentials to access the account associated with the video playback application is displayed.

Returning to FIG. 1, in one or more embodiments the content visibility control system 106 includes the emergency content display system 126 and the emergency content transfer system 128. The emergency content display system 126 detects when a user is having a potential health issue, and displays various medical relevant information regarding the user (e.g., any medical conditions the user has, any medicines the user is taking) in response to the wearable device detecting a potential user health issue. This allows a responder arriving to assist the user to have access to important medical information that the user typically keeps confidential, but is valuable to the responder in assisting the user. The emergency content transfer system 128 transfers medical information to other devices of the responder, further providing the responder with information valuable to assist the user.

Figure 10:
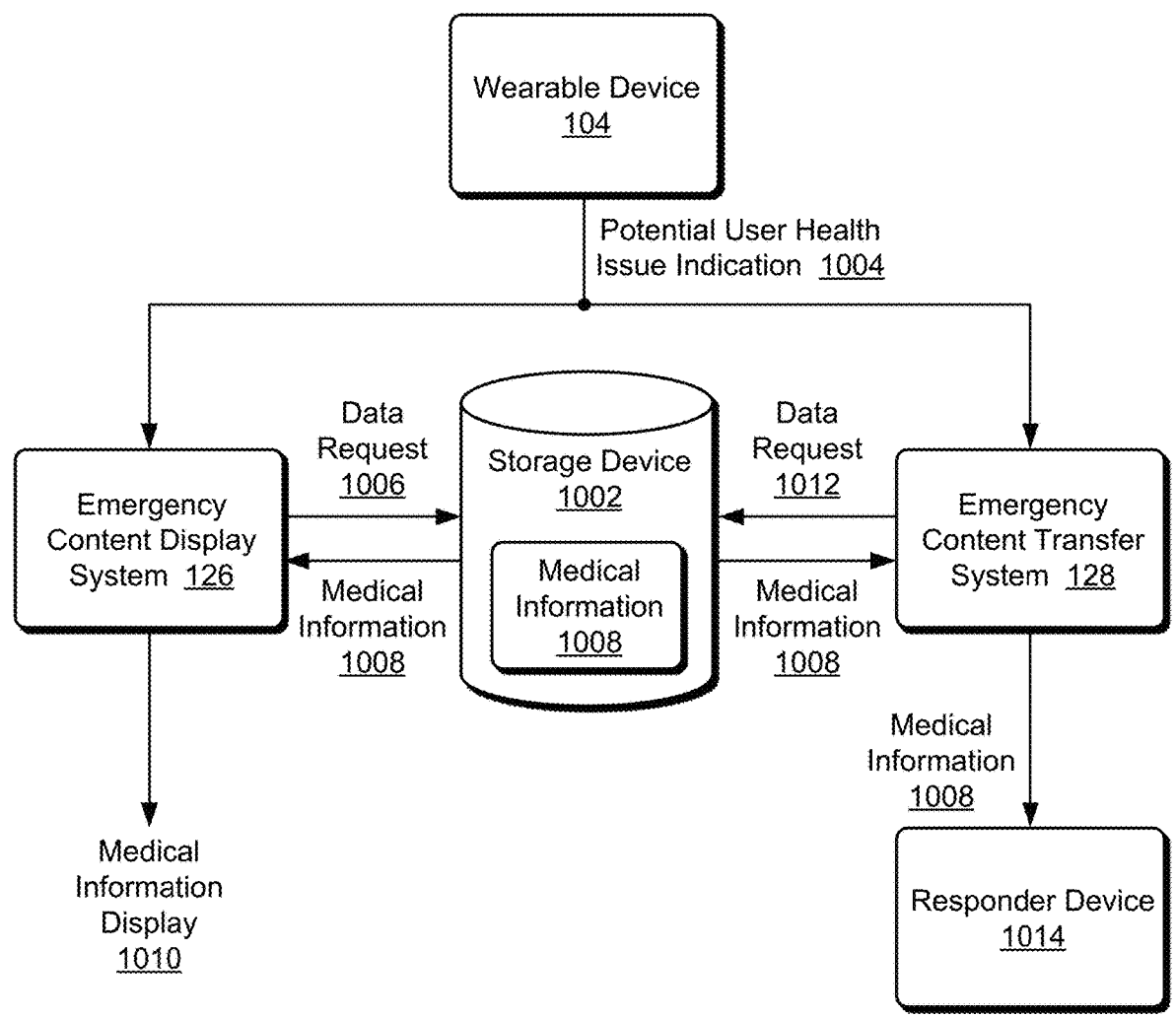
FIG. 10 illustrates an example use of the emergency content display system and emergency content transfer system.

FIG. 10 illustrates an example use of the emergency content display system and emergency content transfer system. The emergency content display system 126 and the emergency content transfer system 128 are illustrated, along with the wearable device 104 and a storage device 1002. The wearable device 104 can detect various different potential user health issues. For example, the wearable device 104 can detect a heart rate that is too high (e.g., above a threshold amount, such as 170) or too low (e.g., below a threshold amount, such as 50). By way of another example, the wearable device 104 can detect that an electrocardiogram (ECG) signal indicates a potential health issue. By way of another example, the wearable device 104 can detect that a physical shock or impact has occurred (e.g., by detecting (e.g. using an accelerometer) a high force or shock is applied to the wearable device 104 over a short period of time) that indicates the user may have been involved in a vehicle accident. By way of another example, the wearable device 104 can detect that the user may have fallen.

In response to detecting a potential user health issue, the wearable device 104 sends a potential user health issue indication 1004 to the computing device 102. The potential user health issue indication 1004 is communicated from the wearable device 104 to the computing device 102 wirelessly using any of a variety of communication protocols, such as Bluetooth or Bluetooth Low Energy. The emergency content display system 126 and the emergency content transfer system 128 of the computing device 102 receive the potential user health issue indication 1004. In response to the potential user health issue indication 1004 the emergency content display system 126 sends a data request 1006 to the storage device 1002 for confidential medical information stored in the storage device 1002, illustrated as medical information 1008. The storage device 1002 can be, for example, the storage device 602 of FIG. 6.

Any of a variety of information about the user can be maintained as medical information 1008. In one or more embodiments, this medical information 1008 is information input to the computing device 102 by the user for use in an emergency. For example, the medical information can include medical conditions the user has, medicines the user is taking, the name and phone number of the user's doctor, and so forth.

In response to the data request 1006, the medical information 1008 is provided to the emergency content display system 126, which outputs a medical information display 1010 on the display screen of the computing device 102. Thus, when a responder arrives, the medical information 1008 is displayed on the display screen of the computing device 102 to assist the responder. This medical information is thus made highly visible in this situation. The emergency content display system 126 optionally generates additional outputs in response to the data request 1006, such as an audio output interpretation indicating help is needed, the user is hurt, call emergency, call a doctor, and so forth.

The emergency content transfer system 128, in response to the potential user health issue indication 1004, also sends a data request 1012 to the storage device 1002 for confidential medical information stored in the storage device 1002. In the illustrated example this is the medical information 1008. Additionally or alternatively, different medical information may be provided to the emergency content transfer system 128 than is provide to the emergency content display system 126. For example, the medical information provided to the emergency content transfer system 128 may be more detailed (e.g., a full medical history of the user) whereas the medical information provided to the emergency content display system 126 is less detailed to allow easier viewing on the display screen of the computing device 102.

The emergency content transfer system 128 communicates the medical information 1008 to a responder device 1014. The emergency content transfer system 128 can communicate the medical information 1008 to the responder device 1014 using any of a variety of different wired or wireless communication protocols, such as Bluetooth, near-field communication (NFC), universal serial bus (USB), and so forth. The responder device 1014 can be any of a variety of different computing devices, such as a smartphone or other mobile device, or specialized medical equipment used by the responder.

It should be noted that the emergency content display system 126 outputs the medical information display 1010 and the emergency content transfer system 128 communicates the medical information 1008 to the responder device 1014 without the user needing to unlock the computing device 102. The emergency content display system 126 display and the emergency content transfer system 128 communication both bypass the security of the computing device 102 and display/communicate the medical information. The potential user health issue indication 1004 is the signal that authorizes this bypass.

Figure 11:
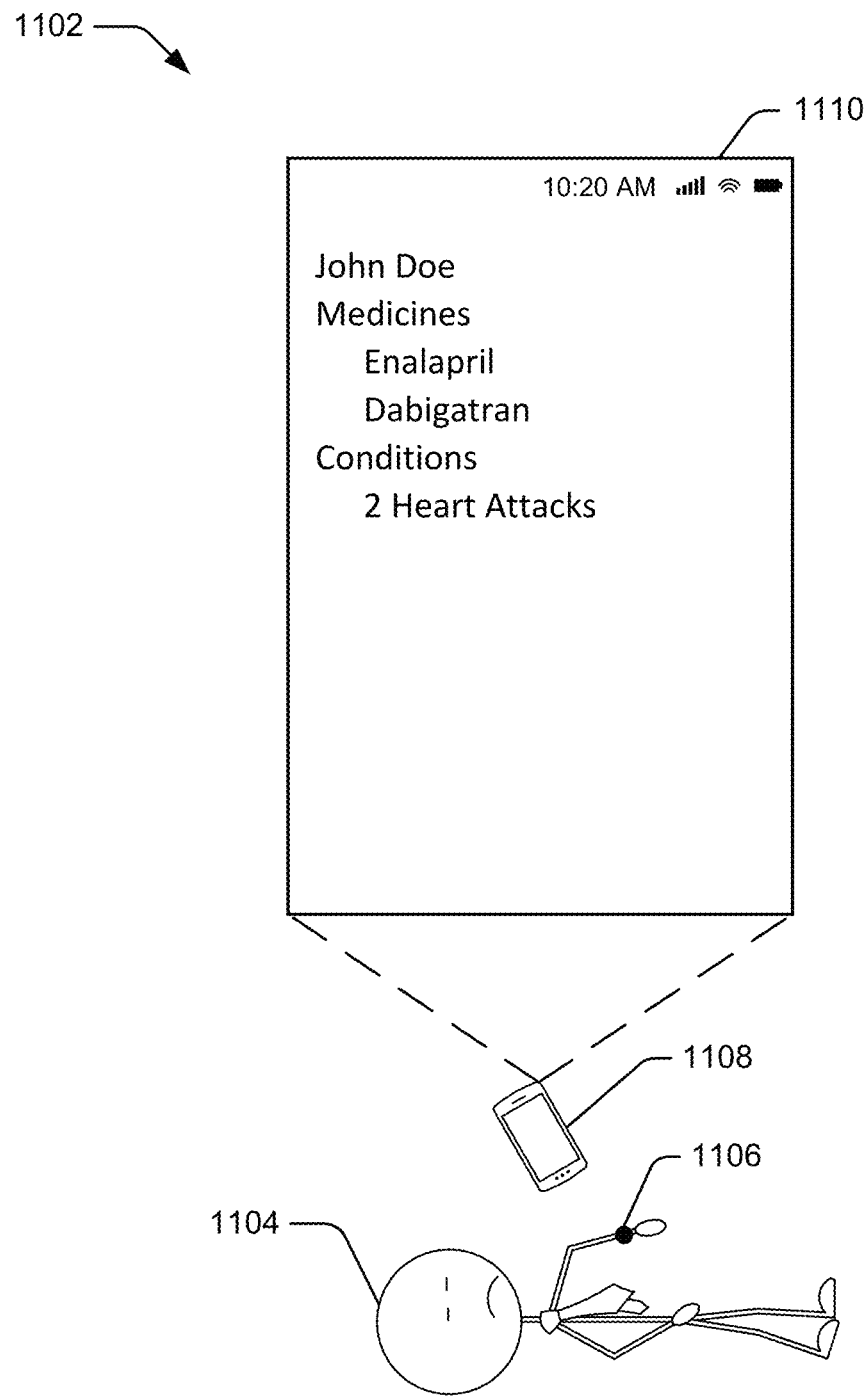
FIG. 11 illustrates an example of displaying medical information.

FIG. 11 illustrates an example operation of displaying medical information. At 1102 a user 1104 is illustrated. The user 1104 is wearing a wearable device 1106 illustrated as a smartwatch, and has a computing device 1108 illustrated as a smartphone. At 1102 the wearable device 1106 has detected a potential user health issue. In response, medical information regarding the user 1104 is displayed on the display screen 1110 of the computing device 1108. For example, the medical information can include the user's name, medicines the user is currently taking, and medical conditions the user has (e.g., two previous heart attacks). When a responder arrives, this medical information is also communicated to a computing device of the responder. Additional medical information (e.g., dosages of the medicines the user is currently taking, dates of the two previous heart attacks) is optionally communicated to the computing device of the responder.

Returning to FIG. 6, it should be noted that one or more of the various modules, systems, and storage devices in the content visibility control system 106 can be implemented by the wearable device 104 rather than the computing device 102. For example, the authentication module 120 can be implemented by the wearable device 104 so that the wearable device 104 receives the authentication input 610 and provides the authentication data 612 to the computing device 102. By way of another example, the content visibility determination module 114 can be implemented at least in part by the wearable device 104 so that the wearable device 104 determines a current location of the computing device 102, or the wearable device 104 determines whether a current location of the computing device 102 is a safe location for making user-selectable content visible on a display screen of the computing device 102, or the wearable device 104 determines whether the wearable device 104 is in close proximity to the computing device 102 (and optionally the user is authenticated to the wearable device 104, or the user is wearing the wearable device 104, or the user is both authenticated to the wearable device 104 and wearing the wearable device 104), and so forth. By way of another example, the content visibility determination module 114 can be implemented at least in part by the wearable device 104 so that the wearable device 104 generates the reduced visibility instructions 618.

It should be noted that the controlling content visibility on a computing device based on wearable device proximity techniques discussed herein can be configured by a user of the computing device 102. This configuration can include enabling and disabling these techniques so that they are or are not applied, respectively. This configuration can also be selection of priorities for location-based actions (e.g., particular locations where content visibility is not reduced), whether actions based on location or proximity of the wearable device 104 to the computing device 102 are to have priority, and so forth. This configuration can also be selection of various parameters for determining whether the wearable device 104 is in close proximity to the computing device 102 (e.g., how close the wearable device 104 is to be to the computing device 102 to be in close proximity), whether a particular location is a safe location (e.g., how a safe location for sharing user-selectable content is determined), and so forth.

Thus, as can be seen from the discussion herein, different content visibility modes can be used for the same user account (e.g., the same user login or authentication input). The user need not log into a different user account to switch from the full content visibility mode to a reduced content visibility mode, from a reduced content visibility mode to the full content visibility mode, or from one reduced content visibility mode to another reduced content visibility mode. Rather, the user can switch between different content visibility modes while using or remaining logged into the same user account.

It should further be noted that, as discussed above, when the computing device 102 is in the full content visibility mode the content visibility determination module 114 continues to monitor whether the computing device 102 is to change to the reduced content visibility mode. Similarly, when the computing device 102 is in the reduced content visibility mode the content visibility determination module 114 continues to monitor whether the computing device 102 is to change to the full content visibility mode. These changes between reduced content visibility mode and full content visibility mode are performed while the user is logged into the computing device 102 (e.g., a new authentication input 610 need not be provided at each change between content visibility modes).

Figure 12:
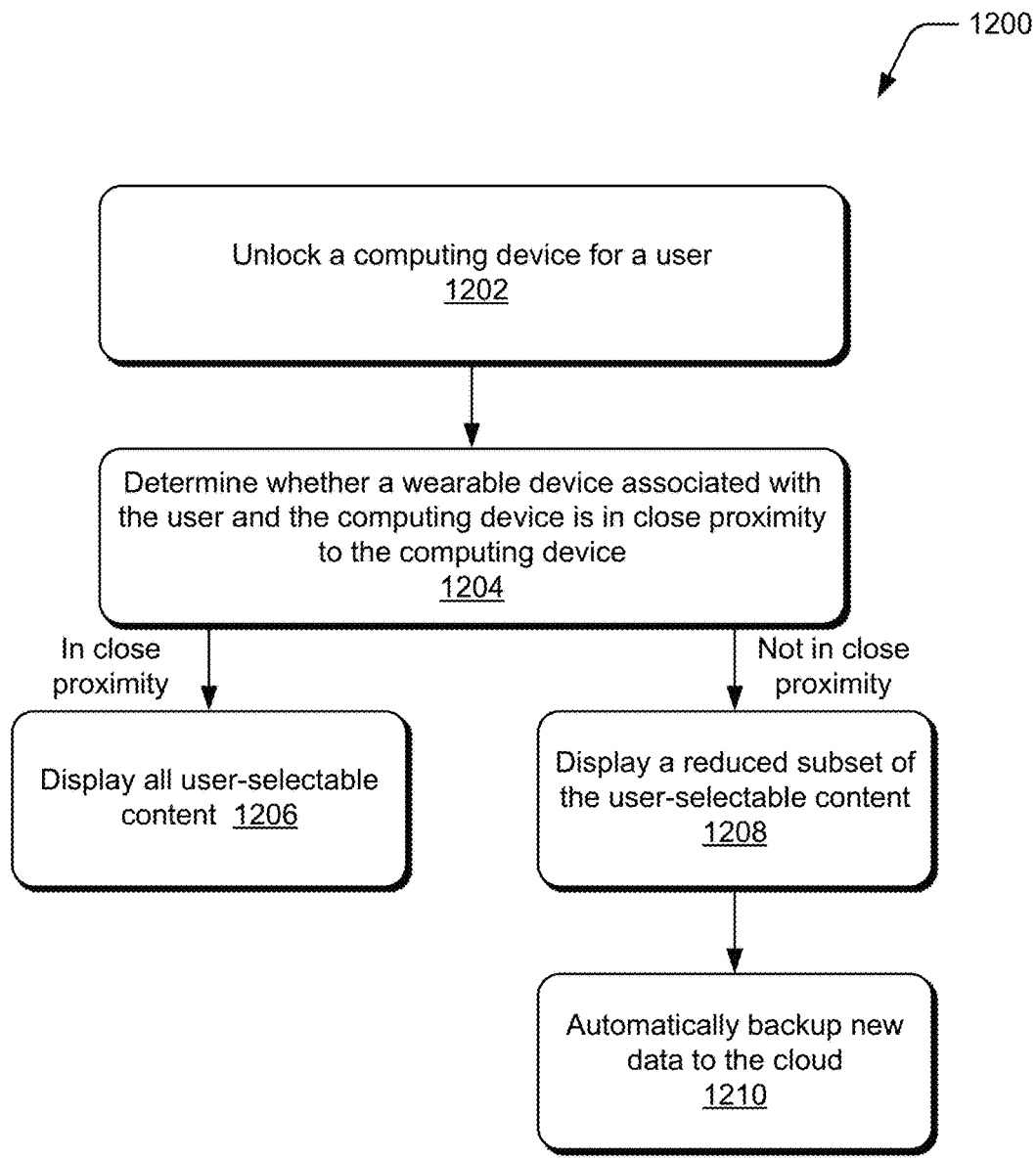
FIG. 12 illustrates an example process for implementing the techniques discussed herein in accordance with one or more embodiments.

FIG. 12 illustrates an example process 1200 for implementing the techniques discussed herein in accordance with one or more embodiments. Process 1200 is carried out by a content visibility control system, such as the content visibility control system 106 of FIG. 1 or FIG. 6, and can be implemented in software, firmware, hardware, or combinations thereof. Process 1200 is shown as a set of acts and is not limited to the order shown for performing the operations of the various acts.

In process 1200, a computing device is unlocked for a user (act 1202). The computing device is unlocked in response to an authentication input that authenticates the user (e.g., verifies that the user is authorized to access user-selectable content and functionality of the computing device). The authentication input can be received in various manners as discussed above, such as a PIN or fingerprint from the user, a signal from a wearable device, and so forth.

A determination is made as to whether a wearable device associated with the user and the computing device is in close proximity to the computing device (act 1204). Whether a wearable device is in close proximity to the computing device can be determined in a variety of different manners as discussed above. This determination optionally includes one or both of determining that the user is authenticated to the wearable device and determining that the user is wearing the wearable device.

In response to determining that a wearable device associated with the user and the computing device is in close proximity to the computing device (and optionally the user is authenticated to the wearable device 104, or the user is wearing the wearable device 104, or the user is both authenticated to the wearable device 104 and wearing the wearable device 104), all user-selectable content is displayed by the computing device (act 1206). As discussed above, the user-selectable content may be displayed across multiple different pages. Furthermore, in act 1206 the computing device is operating in the full content visibility mode.

In response to determining that a wearable device associated with the user and the computing device is not in close proximity to the computing device (or optionally that the user is not authenticated to the wearable device or the user is not wearing the wearable device), a reduced subset of user-selectable content is displayed to the user (act 1208). Displaying the reduced subset of user-selectable content can include, for example, content not being fully visible on the computing device screen, content being blurred or scrambled on the device screen, and so forth. As discussed above, the user-selectable content may be displayed across multiple different pages. Furthermore, in act 1208 the computing device is operating in the reduced content visibility mode.

Additionally, in response to determining that a wearable device associated with the user and the computing device is not in close proximity to the computing device (or optionally that the user is not authenticated to the wearable device or the user is not wearing the wearable device), new data received at the computing device is backed up to the cloud (act 1210). Various new data can be backed up to the cloud as discussed above, such as data input by the user of the computing device, data received by the computing device (e.g., email or text messages), images captured by the computing device, and so forth.

Figure 13:
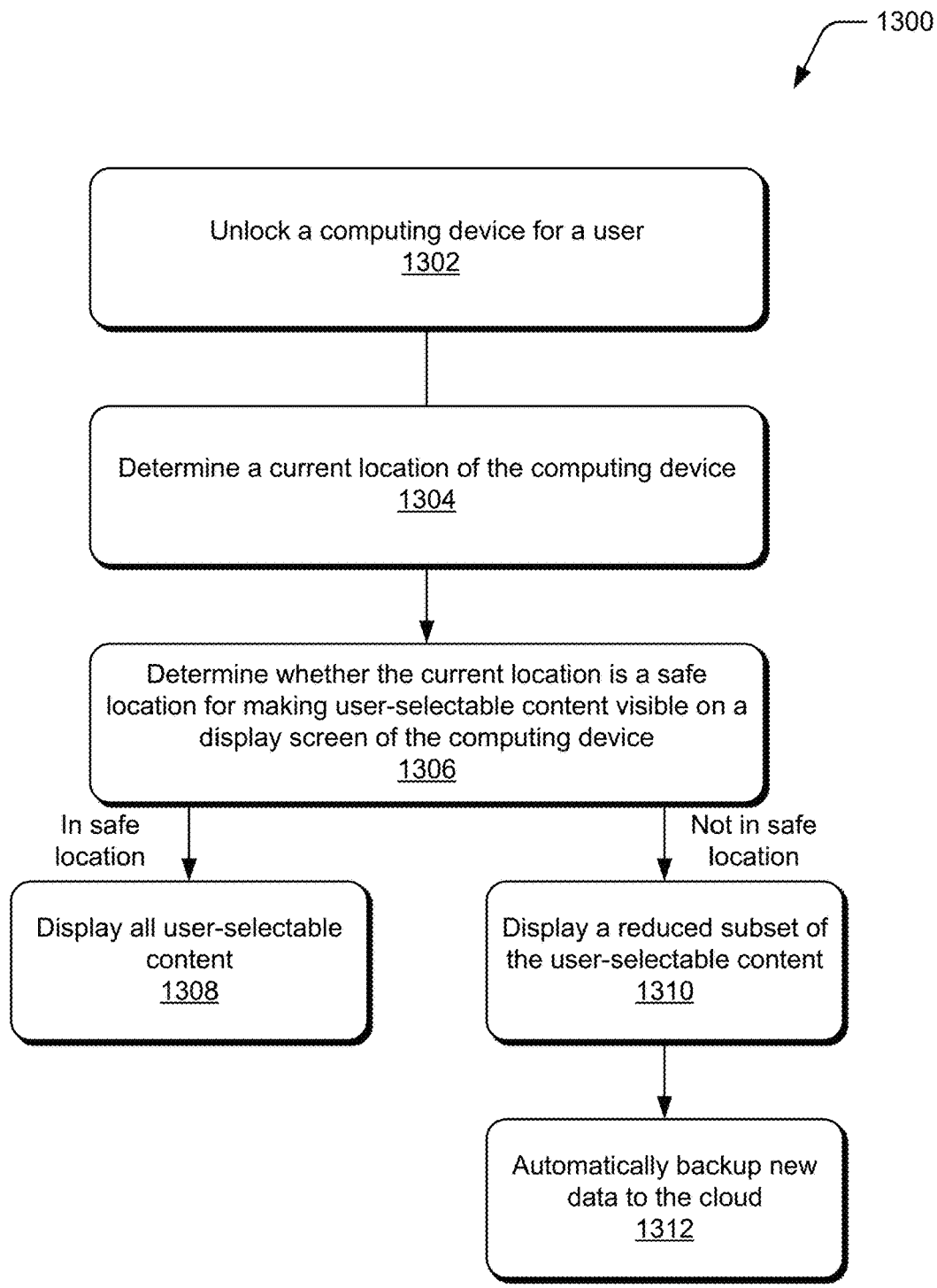
FIG. 13 illustrates another example process for implementing the techniques discussed herein in accordance with one or more embodiments.

FIG. 13 illustrates another example process 1300 for implementing the techniques discussed herein in accordance with one or more embodiments. Process 1300 is carried out by a content visibility control system, such as the content visibility control system 106 of FIG. 1 or FIG. 6, and can be implemented in software, firmware, hardware, or combinations thereof. Process 1300 is shown as a set of acts and is not limited to the order shown for performing the operations of the various acts.

In process 1300, a computing device is unlocked for a user (act 1302). The computing device is unlocked in response to an authentication input that authenticates the user (e.g., verifies that the user is authorized to access user-selectable content and functionality of the computing device). The authentication input can be received in various manners as discussed above, such as a PIN or fingerprint from the user, a signal from a wearable device, and so forth.

A current location of the computing device is determined (act 1304). The current location of the computing device can be determined in a variety of different manners as discussed above, such as using sensors in the computing device or sensors in a wearable device.

A determination is made as to whether the current location is a safe location for making user-selectable content visible on a display screen of the computing device (act 1306). Various different rules or criteria can be applied to the location data to determine whether the computing device is in a safe location for making user-selectable content visible on a display screen of the computing device as discussed above.

In response to determining that the current location is a safe location for making user-selectable content visible on a display screen of the computing device, all user-selectable content is displayed to the user (act 1308). As discussed above, the user-selectable content may be displayed across multiple different pages. Furthermore, in act 1308 the computing device is operating in the full content visibility mode.

In response to determining that the current location is not a safe location for making user-selectable content visible on a display screen of the computing device, a reduced subset of user-selectable content is displayed by the computing device (act 1310). Displaying the reduced subset of user-selectable content can include, for example, content not being fully visible on the computing device screen, content being blurred or scrambled on the device screen, and so forth. As discussed above, the user-selectable content may be displayed across multiple different pages. Furthermore, in act 1310 the computing device is operating in the reduced content visibility mode.

Additionally, in response to determining that the current location is not a safe location for making user-selectable content visible on a display screen of the computing device, new data received at the computing device is backed up to the cloud (act 1312). Various new data can be backed up to the cloud as discussed above, such as data input by the user of the computing device, data received by the computing device (e.g., email or text messages), images captured by the computing device, and so forth.

Figure 14:
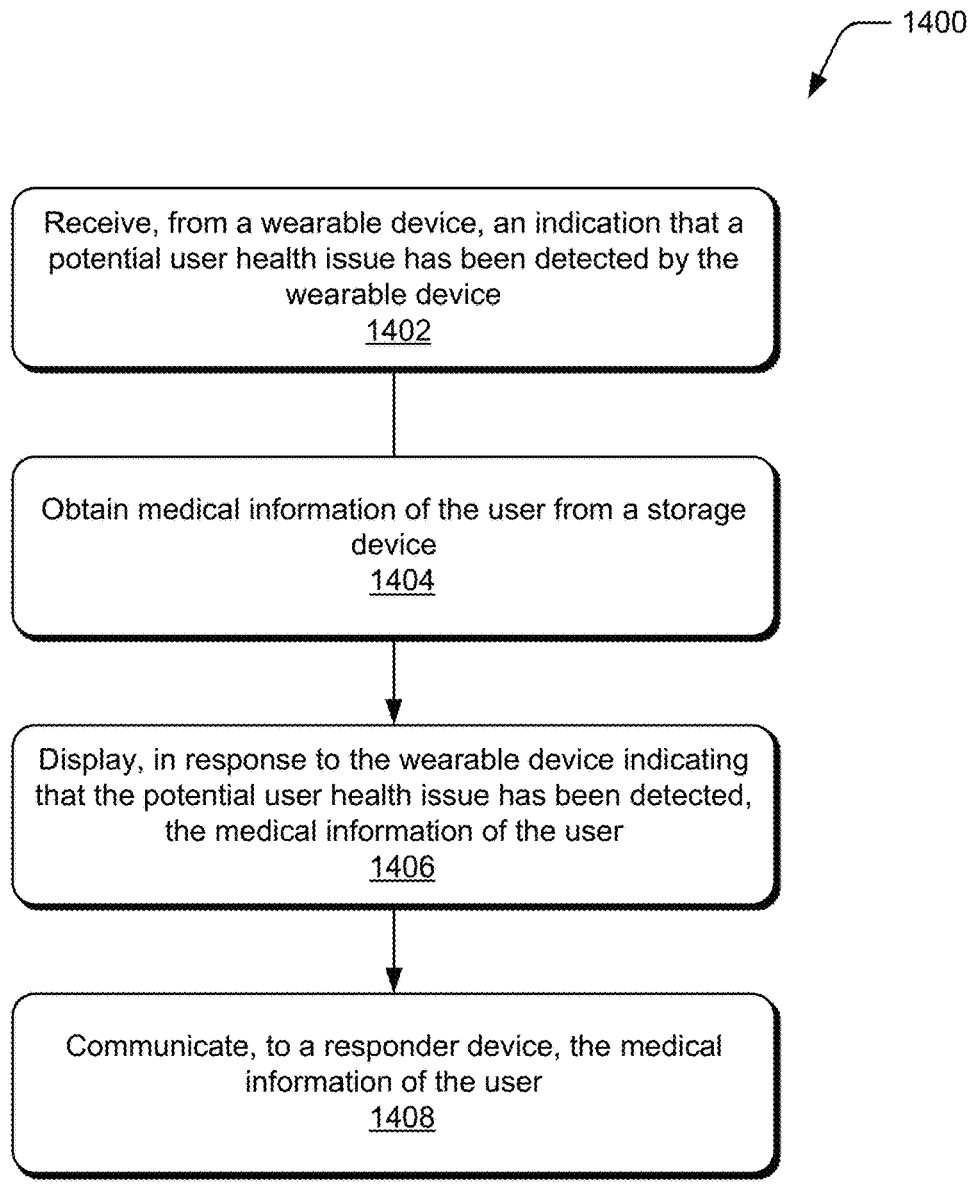
FIG. 14 illustrates another example process for implementing the techniques discussed herein in accordance with one or more embodiments.

FIG. 14 illustrates another example process 1400 for implementing the techniques discussed herein in accordance with one or more embodiments. Process 1400 is carried out by a content visibility control system, such as the content visibility control system 106 of FIG. 1 or FIG. 6, and can be implemented in software, firmware, hardware, or combinations thereof. Process 1400 is shown as a set of acts and is not limited to the order shown for performing the operations of the various acts.

In process 1400, an indication is received from a wearable device that a potential user health issue has been detected by the wearable device (act 1402). Various different types of potential user health issues can be detected, such as a heart rate that is too high or too low, an indication that the user has been involved in an automobile accident, and so forth as discussed above.

Medical information for the user is obtained from a storage device (act 1404). Various different medical information can be obtained, such as any medical conditions the user has, any medicines the user is taking, and so forth.

The obtained medical information is displayed in response to the wearable device indicating that a potential user health issue has been detected (act 1406). This allows a responder arriving to assist the user to see the obtained medical information.

The obtained medical information is also communicated to a responder device (act 1408). The medical information communicated to the responder device in act 1408 can be the same medical information as was displayed in act 1406, or alternatively different medical information. For example, the medical information communicated to the responder device may be more detailed (e.g., a full medical history of the user) whereas the medical information provided to the emergency content display system may be less detailed to allow easier viewing on the display screen of the computing device.

Figure 15:
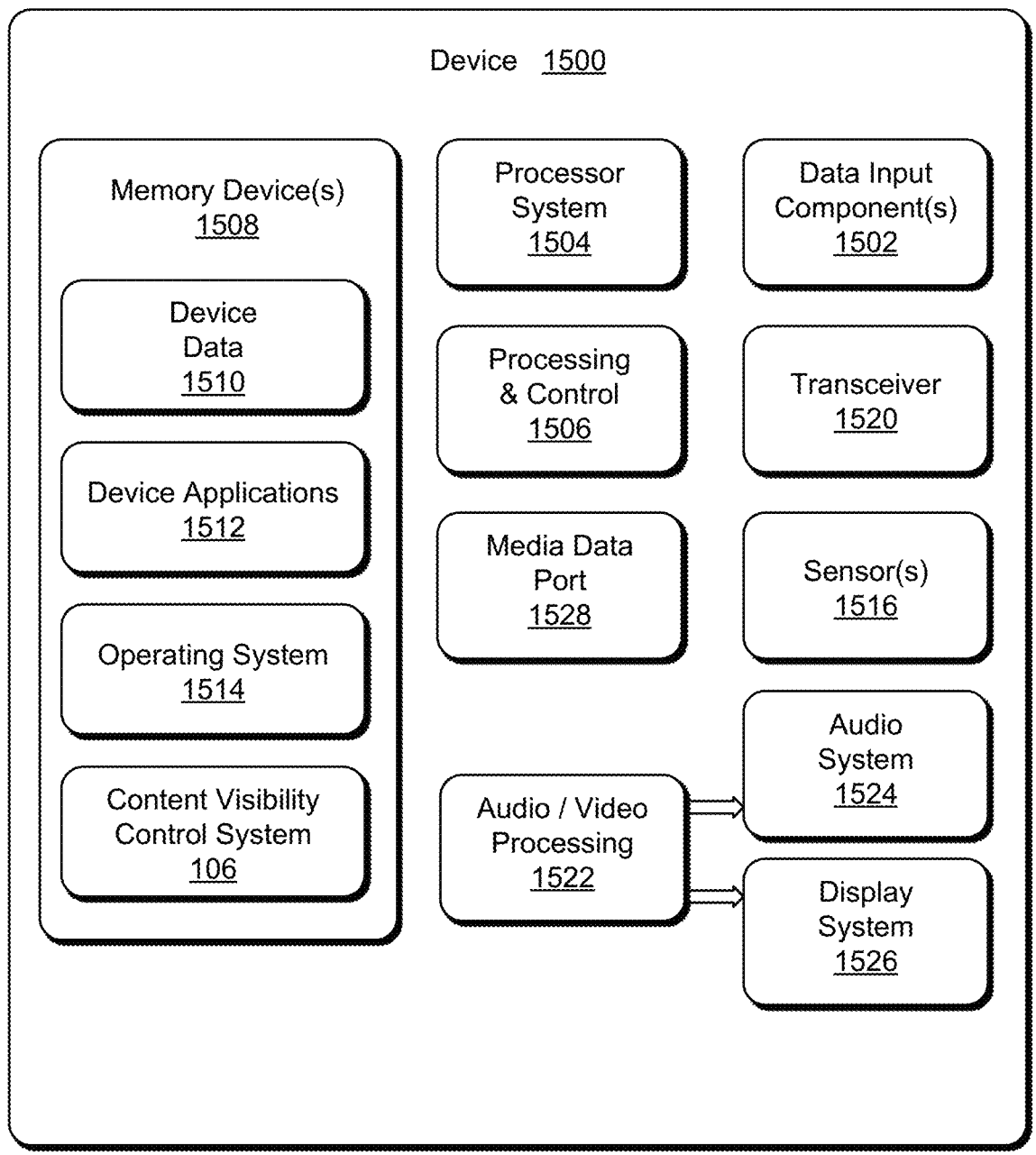
FIG. 15 illustrates various components of an example electronic device that can be implemented as a computing device as described herein.

FIG. 15 illustrates various components of an example electronic device 1500 that can be implemented as a computing device or a wearable device as described with reference to any of the previous FIGS. 1-14. The device 1500 may be implemented as any one or combination of a fixed or mobile device in any form of a consumer, computer, portable, user, communication, phone, navigation, gaming, messaging, Web browsing, paging, media playback, or other type of electronic device.

The electronic device 1500 can include one or more data input components 1502 via which any type of data, media content, or inputs can be received such as user-selectable inputs, messages, music, television content, recorded video content, and any other type of audio, video, or image data received from any content or data source. The data input components 1502 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1502 may also include various other input components such as microphones, touch sensors, keyboards, cameras or other image capture components, and so forth.

The electronic device 1500 of this example includes a processor system 1504 (e.g., any of microprocessors, controllers, and the like) or a processor and memory system (e.g., implemented in a system on a chip), which processes computer executable instructions to control operation of the device 1500. A processor system 1504 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1500 can be implemented with any one or combination of software, hardware, firmware, or fixed logic circuitry implemented in connection with processing and control circuits that are generally identified at 1506. Although not shown, the electronic device 1500 can include a system bus or data transfer system that couples the various components within the device 1500. A system bus can include any one or combination of different bus structures such as a memory bus or memory controller, a peripheral bus, a universal serial bus, or a processor or local bus that utilizes any of a variety of bus architectures.

The electronic device 1500 also includes one or more memory devices 1508 that enable data storage such as random access memory, nonvolatile memory (e.g., read only memory, flash memory, erasable programmable read only memory, electrically erasable programmable read only memory, etc.), and a disk storage device. A memory device 1508 provides data storage mechanisms to store the device data 1510, other types of information or data (e.g., data backed up from other devices), and various device applications 1512 (e.g., software applications). For example, an operating system 1514 can be maintained as software instructions with a memory device and executed by the processor system 1504.

In one or more embodiments the electronic device 1500 includes a content visibility control system 106, described above. Although represented as a software implementation, the content visibility control system 106 may be implemented as any form of a control application, software application, signal processing and control module, firmware that is installed on the device 1500, a hardware implementation of the system 106, and so on.

It should be noted that in some situations, at least some of the processing performed by the electronic device 1500 can be offloaded to a distributed system, such as over a "cloud" service. Such a cloud service includes one or more electronic devices to implement at least some of processing discussed herein as being performed by the electronic device 1500.

The electronic device 1500 also optionally includes one or more sensors 1516. These sensors 1516 can be any of a variety of different types of sensors discussed above. For example, sensors 1516 can be sensors detecting location or context of the electronic device 1500, imaging sensors (e.g., cameras or other image capture devices), sound sensors (e.g., microphones), and so forth.

Moreover, in one or more embodiments various techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1508.

The electronic device 1500 also includes a transceiver 1520 that supports wireless and/or wired communication with other devices or services allowing data and control information to be sent as well as received by the device 1500. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, Bluetooth protocols, NFC protocols, USB protocols, and so forth.

The electronic device 1500 can also include an audio or video processing system 1522 that processes audio data or passes through the audio and video data to an audio system 1524 or to a display system 1526. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1528. In implementations the audio system or the display system are external components to the electronic device. Alternatively or in addition, the display system can be an integrated component of the example electronic device, such as part of an integrated touch interface. For example, the display system 1526 can be configured as any suitable type of display screen, such as an organic light-emitting diode (OLED) display, active matrix OLED display, liquid crystal display (LCD), in-plane shifting LCD, projector, and so forth.

Although embodiments of techniques for implementing controlling content visibility on a computing device based on wearable device proximity have been described in language specific to features or methods, the subject of the appended claims is not necessarily limited to the specific features or methods described. Rather, the specific features and methods are disclosed as example implementations of techniques controlling content visibility on a computing device based on wearable device proximity.

What is claimed is:

1. A method implemented in a computing device, the method comprising:
    unlocking the computing device for a user;
    determining whether a wearable device associated with the computing device is in close proximity to the computing device and is currently being worn by the user, the wearable device being one class of multiple classes of wearable devices, the different ones of the multiple classes having different associated reduced subsets of user-selectable content;
    displaying, in response to the wearable device being in close proximity to the computing device and currently being worn by the user, user-selectable content on a display screen of the computing device, the user-selectable content including at least one application of the computing device; and
    displaying, in response to the wearable device not being in close proximity to the computing device or not currently being worn by the user, a reduced subset of the user-selectable content associated with the one class of wearable devices.

2. The method as recited in claim 1, wherein:
    the determining further comprises determining whether the user has been authenticated to the wearable device;
    the displaying the user-selectable content comprises displaying, in response to the wearable device being in close proximity to the computing device and currently being worn by the user and the user having been authenticated to the wearable device, the user-selectable content on the display screen of the computing device; and
    displaying the reduced subset of the user-selectable content comprises displaying, in response to the wearable device not being in close proximity to the computing device or not currently being worn by the user or the user not being authenticated to the wearable device, the reduced subset of the user-selectable content.

3. The method as recited in claim 1, further comprising toggling between displaying the user-selectable content and displaying the reduced subset of the user-selectable content in response to commands received from the wearable device indicating user input to the wearable device to toggle between displaying the user-selectable content and displaying the reduced subset of the user-selectable content.

4. The method as recited in claim 1, the displaying the reduced subset of the user-selectable content comprising ceasing displaying identifiers and notifications of user-selectable content that is not in the reduced subset of the user-selectable content.

5. The method as recited in claim 1, the displaying the reduced subset of the user-selectable content comprising ignoring user inputs to access user-selectable content that is not in the reduced subset of the user-selectable content.

6. The method as recited in claim 1, the displaying the reduced subset of the user-selectable content comprising not displaying alerts and notifications for applications that are not in the reduced subset of the user-selectable content.

7. The method as recited in claim 1, further comprising:
    automatically logging, in response to the wearable device being in close proximity to the computing device and currently being worn by the user, the user into an account associated with an application; and
    displaying, in response to the wearable device not being in close proximity to the computing device or not currently being worn by the user, a login page for the application without automatically logging the user into the account associated with the application.

8. The method as recited in claim 1, further comprising backing up, in response to the wearable device not being in close proximity to the computing device, to the cloud new data received by the computing device.

9. The method as recited in claim 1, further comprising:
    receiving, from the wearable device, an indication that the wearable device has detected a potential user health issue; and
    displaying, in response to the indication that the wearable device has detected the potential user health issue, medical relevant information of the user.

10. The method as recited in claim 1, the determining whether the wearable device is currently being worn by the user comprising one or a combination of determining whether a heart rate of the user is sensed by the wearable device, determining whether a particular temperature is sensed by the wearable device, and determining whether motion of the wearable device consistent with arm movements is detected by the wearable device.

11. A computing device comprising:
    a display screen;
    a storage device to store reduced content visibility mode configuration data identifying user-selectable content in a reduced subset of user-selectable content;
    a transceiver to receive wireless communication from a wearable device associated with the computing device; and a processor system that implements a content visibility control system to:
unlock the computing device for a user;
determine whether the wearable device is in close proximity to the computing device and is currently being worn by the user, the wearable device being one class of multiple classes of wearable devices, the different ones of the multiple classes having different associated reduced subsets of user-selectable content;
display, in response to the wearable device being in close proximity to the computing device and currently being worn by the user, user-selectable content on the display screen, the user-selectable content including at least one application of the computing device; and
display, in response to the wearable device not being in close proximity to the computing device or not currently being worn by the user, the reduced subset of the user-selectable content associated with the one class of wearable devices.

12. The computing device as recited in claim 11, wherein to display the reduced subset of the user-selectable content is to cease displaying identifiers of user-selectable content that is not in the reduced subset of the user-selectable content.

13. The computing device as recited in claim 11, wherein to display the reduced subset of the user-selectable content is to not display alerts and notifications for applications that are not in the reduced subset of the user-selectable content.

14. The computing device as recited in claim 11, wherein the content visibility control system is further to:
automatically log, in response to the wearable device being in close proximity to the computing device, the user into an account associated with an application; and
display, in response to the wearable device not being in close proximity to the computing device, a login page for the application without automatically logging the user into the account associated with the application.

15. The computing device as recited in claim 11, wherein the content visibility control system is further to:
receive, from the wearable device, an indication that the wearable device has detected a potential user health issue; and
display, in response to the indication that the wearable device has detected the potential user health issue, medical information of the user.

16. The computing device as recited in claim 11, wherein:
the content visibility control system is further to determine whether the user has been authenticated to the wearable device;
to display the user-selectable content is to display, in response to the wearable device being in close proximity to the computing device and currently being worn by the user and the user having been authenticated to the wearable device, the user-selectable content on the display screen of the computing device; and
to display the reduced subset of the user-selectable content is to display, in response to the wearable device not being in close proximity to the computing device or not currently being worn by the user or the user not being authenticated to the wearable device, the reduced subset of the user-selectable content.

17. The computing device as recited in claim 11, wherein the content visibility control system is further to toggle between displaying the user-selectable content and displaying the reduced subset of the user-selectable content in response to commands received from the wearable device indicating user input to the wearable device to toggle between displaying the user-selectable content and displaying the reduced subset of the user-selectable content.

18. The computing device as recited in claim 11, wherein to display the reduced subset of the user-selectable content comprises ignoring user inputs to access user-selectable content that is not in the reduced subset of the user-selectable content.

19. The computing device as recited in claim 11, wherein the content visibility control system is further to back up, in response to the wearable device not being in close proximity to the computing device, to the cloud new data received by the computing device.

20. The computing device as recited in claim 11, the determining whether the wearable device is currently being worn by the user comprising one or a combination of determining whether a heart rate of the user is sensed by the wearable device, determining whether a particular temperature is sensed by the wearable device, and determining whether motion of the wearable device consistent with arm movements is detected by the wearable device.

* * * * *